(12) United States Patent
Cutler

(10) Patent No.: US 11,089,265 B2
(45) Date of Patent: *Aug. 10, 2021

(54) TELEPRESENCE DEVICES OPERATION METHODS

(71) Applicant: MICROSOFT TECHNOLOGY LICENSING, LLC, Redmond, WA (US)

(72) Inventor: Ross Garrett Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,672

(22) Filed: Apr. 17, 2018

(65) Prior Publication Data
US 2019/0320142 A1    Oct. 17, 2019

(51) Int. Cl.
*H04N 7/15* (2006.01)
*H04L 12/18* (2006.01)
*H04N 7/14* (2006.01)
*G06F 3/01* (2006.01)

(52) U.S. Cl.
CPC ......... *H04N 7/157* (2013.01); *H04L 12/1827* (2013.01); *H04N 7/147* (2013.01); *G06F 3/011* (2013.01)

(58) Field of Classification Search
CPC .... H04N 7/157; H04N 7/147; H04L 12/1827; G06F 3/011
See application file for complete search history.

(56) References Cited

U.S. PATENT DOCUMENTS

| 6,259,470 B1 | 7/2001 | Koizumi et al. |
| 7,139,767 B1 | 11/2006 | Taylor et al. |
| 8,432,432 B2 | 4/2013 | Cutler |
| 8,619,082 B1 | 12/2013 | Ciurea et al. |
| 9,055,216 B1 | 6/2015 | Taylor |
| 9,681,096 B1 | 6/2017 | Motta et al. |
| 9,928,655 B1 * | 3/2018 | Alston ............... G06T 7/74 |

(Continued)

FOREIGN PATENT DOCUMENTS

| EP | 3493533 A1 | 6/2019 |
| WO | 2016054089 A1 | 4/2016 |

(Continued)

OTHER PUBLICATIONS

Yang, et al., "Eye Gaze Correction with Stereovision for Video Tele-Conferencing", In Proceedings of 7th European Conference on Computer Vision, May 28, 2002, 16 Pages.

(Continued)

*Primary Examiner* — Stella L. Woo
(74) *Attorney, Agent, or Firm* — NovoTechIP International PLLC

(57) ABSTRACT

A method of operating a telepresence device is disclosed, which includes capturing images of a local subject using a plurality of cameras to generate a plurality of local captured images. Remote subject point of view (POV) data is received from a remote device. A plurality of tiles is selected from the plurality of local captured images based on the remote subject POV data. Local image data is sent to the remote device. The local image data includes the plurality of selected tiles.

32 Claims, 13 Drawing Sheets

(56) References Cited

U.S. PATENT DOCUMENTS

| | | | |
|---|---|---|---|
| 9,942,513 | B1 | 4/2018 | Aarrestad et al. |
| 10,122,969 | B1 | 11/2018 | Hoon et al. |
| 10,291,907 | B2 | 5/2019 | Huber et al. |
| 10,554,928 | B2* | 2/2020 | Cutler .................. H04N 7/142 |
| 2003/0197779 | A1 | 10/2003 | Zhang et al. |
| 2005/0117034 | A1 | 6/2005 | Cutler et al. |
| 2010/0329358 | A1 | 12/2010 | Zhang et al. |
| 2011/0199497 | A1 | 8/2011 | Motta |
| 2011/0255844 | A1 | 10/2011 | Wu et al. |
| 2011/0292051 | A1 | 12/2011 | Nelson et al. |
| 2012/0249586 | A1 | 10/2012 | Wither et al. |
| 2013/0057642 | A1 | 3/2013 | Catchpole |
| 2013/0201276 | A1 | 8/2013 | Pradeep et al. |
| 2013/0258044 | A1 | 10/2013 | Betts-lacroix et al. |
| 2013/0271452 | A1 | 10/2013 | Kumar et al. |
| 2014/0022415 | A1 | 1/2014 | Kitaya et al. |
| 2014/0125771 | A1 | 5/2014 | Grossmann et al. |
| 2014/0139694 | A1 | 5/2014 | Grandin et al. |
| 2014/0362170 | A1 | 12/2014 | Walker |
| 2015/0009277 | A1 | 1/2015 | Kuster et al. |
| 2015/0022669 | A1 | 1/2015 | Hall |
| 2015/0054913 | A1 | 2/2015 | Annau et al. |
| 2015/0178923 | A1 | 6/2015 | Liang et al. |
| 2016/0099429 | A1 | 4/2016 | Bruder et al. |
| 2016/0105608 | A1 | 4/2016 | Pettegrew et al. |
| 2016/0105640 | A1 | 4/2016 | Travis et al. |
| 2016/0203607 | A1 | 7/2016 | Muller et al. |
| 2016/0366365 | A1* | 12/2016 | Iyer .................. G06F 3/013 |
| 2016/0381336 | A1 | 12/2016 | Akahane |
| 2016/0381345 | A1 | 12/2016 | Wu et al. |
| 2017/0072563 | A1 | 3/2017 | Anderson-sprecher |
| 2017/0127051 | A1 | 5/2017 | Chavez et al. |
| 2017/0132253 | A1 | 5/2017 | Mckinnon et al. |
| 2017/0187933 | A1 | 6/2017 | Duparre |
| 2017/0244960 | A1 | 8/2017 | Ciurea et al. |
| 2018/0020201 | A1* | 1/2018 | Motta .................. H04N 7/147 |
| 2018/0096494 | A1 | 4/2018 | Zhou |
| 2018/0222476 | A1 | 8/2018 | Ishii et al. |
| 2018/0249274 | A1 | 8/2018 | Lyren et al. |
| 2018/0332317 | A1* | 11/2018 | Song .................. H04N 13/344 |
| 2019/0128670 | A1 | 5/2019 | Chen et al. |
| 2019/0179509 | A1 | 6/2019 | Daie et al. |
| 2019/0320135 | A1 | 10/2019 | Cutler |
| 2019/0373216 | A1 | 12/2019 | Cutler et al. |
| 2021/0019912 | A1 | 1/2021 | Cutler |
| 2021/0021748 | A1 | 1/2021 | Cutler |
| 2021/0021784 | A1 | 1/2021 | Cutler |
| 2021/0021785 | A1 | 1/2021 | Cutler |

FOREIGN PATENT DOCUMENTS

| | | |
|---|---|---|
| WO | 2018039071 A1 | 3/2018 |
| WO | 2018116253 A1 | 6/2018 |

OTHER PUBLICATIONS

Lin, et al., "A Geometric Analysis of Light Field Rendering", In International Journal of Computer Vision, vol. 58, No. 2, Jul. 2004, pp. 121-138.

Tan, et al., "ConnectBoard: Enabling Genuine Eye Contact and Accurate Gaze in Remote Collaboration", In Journal of IEEE Transactions on Multimedia, vol. 13, No. 3, Jun. 2011, pp. 466-473.

Chen, Milton, "Leveraging the Asymmetric Sensitivity of Eye Contact for Videoconferencing", In Proceedings of the SIGCHI conference on Human factors in computing systems, Apr. 20, 2002, 8 Pages.

Stokes, Rembert R., "Human Factors and Appearance Design Considerations of the Mod II Picturephone; Station Set", In Journal of IEEE Transactions on Communication Technology, vol. 17, Issue 2, Apr. 1969, pp. 318-323.

Vertegaal, et al., "Explaining effects of eye gaze on mediated group conversations: amount or synchronization?", In Proceedings of the ACM conference on Computer supported cooperative work, Nov. 16, 2002, pp. 41-48.

Yang, et al., "Interactive 3D Teleconferencing with User-Adaptive Views", In Proceedings of the ACM SIGMM workshop on Effective telepresence, Oct. 15, 2004, pp. 50-51.

Adhikarla, et al., "Fast and Efficient Data Reduction Approach for Multi-Camera Light Field Display Telepresence Systems", In Proceedings of 3DTV Conference on Vision Beyond Depth, Oct. 7, 2013, pp. 1-4.

Graziosi, et al., "Introduction to Tiled Full Parallax Light Field Display and Requirements for FTV Discussion", In Publication of Motion Picture Expert Group, Feb. 23, 2016, 15 Pages.

"International Search Report and Written Opinion Issued in PCT Application No. PCT/US19/025270", dated Jun. 28, 2019, 13 Pages.

"International Search Report and Written Opinion Issued in PCT Application No. PCT/US19/025271", dated Jun. 28, 2019, 13 Pages.

"Non Final Office Action Issued in U.S. Appl. No. 15/955,669", dated Dec. 3, 2018, 14 Pages.

"Final Office Action Issued in U.S. Appl. No. 15/955,669", dated Apr. 26, 2019, 16 Pages.

"Non Final Office Action Issued in U.S. Appl. No. 16/516,182", dated Jan. 29, 2020, 10 Pages.

"Non Final Office Action Issued in U.S. Appl. No. 16/516,187", dated Jan. 3, 2020, 13 Pages.

"Non Final Office Action Issued in U.S. Appl. No. 16/516,193", dated Jan. 30, 2020, 8 Pages.

"Final Office Action Issued in U.S. Appl. No. 16/516,193", dated Jun. 10, 2020, 11 Pages.

"Final Office Action Issued in U.S. Appl. No. 16/516,187", dated Jun. 2, 2020, 12 Pages.

"Final Office Action Issued in U.S. Appl. No. 16/516,193", dated Jul. 27, 2020, 10 Pages.

Zhang, et al., "Flexible Camera Calibration by Viewing a Plane From Unknown Orientations", In Proceedings of the Seventh IEEE International Conference on Computer Vision, Sep. 20, 1999, 8 Pages.

Bajpayee, et al., "Real-Time Light Field Processing for Autonomous Robotics", In Proceedings of the IEEE/RSJ International Conference on Intelligent Robots and Systems, Oct. 1, 2018, pp. 4218-4225.

"International Search Report and Written Opinion Issued in PCT Application No. PCT/US20/034464", dated Jul. 24, 2020, 13 Pages.

"International Search Report and Written Opinion Issued in PCT Application No. PCT/US20/034589", dated Jul. 24, 2020, 16 Pages.

"International Search Report and Written Opinion Issued in PCT Application No. PCT/US20/034762", dated Jul. 24, 2020, 15 Pages.

Tsai, Roger Y., "A Versatile Camera Calibration Technique for High-Accuracy 3D Machine Vision Metrology Using Off-the-shelf TV Cameras and Lenses", In IEEE Journal on Robotics and Automation, vol. 3, Issue 4, Aug. 1987, pp. 323-344.

"Non Final Office Action Issued in U.S. Appl. No. 16/516,193", dated Nov. 16, 2020, 9 Pages.

"International Search Report and Written Opinion Issued in PCT Application No. PCT/US20/035496", dated Sep. 7, 2020, 17 Pages.

"Non-Final Office Action Issued in U.S. Appl. No. 16/516,187", dated Oct. 28, 2020, 9 Pages.

"Final Office Action Issued in U.S. Appl. No. 16/516,187", dated Feb. 10, 2021, 11 Pages.

"Non Final Office Action Issued in U.S. Appl. No. 16/516,196", dated Mar. 22, 2021, 28 Pages.

* cited by examiner

LOCAL: time=t1

LOCAL: time=t2

LOCAL: time=t2

REMOTE: time=t3

REMOTE: time=t3

LOCAL: time=t9

LOCAL: time=t9
display time=t10

TELEPRESENCE DEVICES OPERATION METHODS

CROSS-REFERENCE TO RELATED APPLICATIONS

This application is related to U.S. patent application Ser. No. 15/955,669 filed on Apr. 17, 2018 and issued on Feb. 4, 2020 as U.S. Pat. No. 10,554,928, titled "TELEPRESENCE DEVICE", which is incorporated herein in its entirety.

BACKGROUND

Video conferencing technologies have become increasingly commonplace. Such technologies are now being used worldwide for a wide variety of both personal and business communications. For example, during a teleconference or other video conferencing session, individuals may "interact" and engage in face-to-face conversations through images and sound captured by digital cameras and transmitted to participants. In an attempt to provide more engaging video conferencing experiences, a set of technologies called "telepresence" have been introduced, which aim to allow participants at different geographical locations to feel as if they were present at the same location. The telepresence has provided certain enhancement to conventional video conferencing schemes, but there still remain significant areas for new and improved ideas for more immersive video conferencing experiences.

SUMMARY

In one general aspect, the instant application describes a method of operating a telepresence device. The method includes capturing images of a local subject using a plurality of cameras to generate a plurality of local captured images; receiving remote subject point of view (POV) data from a remote device; selecting a plurality of tiles from the plurality of local captured images based on the remote subject POV data; and sending local image data to the remote device, the local image data including the plurality of selected tiles.

In another implementation, a method of operating a telepresence device includes capturing images of a local subject using a plurality of cameras to generate a plurality of local captured images; processing the plurality of local captured images to generate local subject point of view (POV) data; sending local subject point of view (POV) data to a remote device; receiving remote image data from the remote device, the remote image data including a plurality of first tiles selected by the remote device based on the local subject POV data; selecting a plurality of second tiles from the plurality of first tiles based on the local subject POV data; and displaying, on a display, the image of the remote subject composited based on the plurality of second tiles.

In another implementation, a method of operating telepresence devices includes capturing images of a first subject located at a first location, using a plurality of first cameras of a first telepresence device, to generate a plurality of first captured images of the first subject; capturing images of a second subject located at a second location, using a plurality of second cameras of a second telepresence device, to generate a plurality of second captured images of the second subject; processing, at the first telepresence device, the plurality of first captured images to generate first subject point of view (POV) data; processing, at the second telepresence device, the plurality of second captured images to generate second subject POV data; sending the first subject POV data from the first telepresence device to the second telepresence device; sending the second subject POV data from the second telepresence device to the first telepresence device; selecting, at the first telepresence device, a plurality of first tiles from the plurality of first captured images based on the second subject POV data; sending first image data from the first telepresence device to the second telepresence device, the first image data including the plurality of first tiles; sending second image data from the second telepresence device to the first telepresence device, the second image data including the plurality of second tiles; selecting, at the first telepresence device, a plurality of third tiles from the plurality of second tiles based on the first subject POV data; and displaying, on a first display of the first telepresence device, an image of the second subject composited based on the plurality of third tiles.

In another implementation, a method includes a step for capturing images of a local subject using a plurality of cameras to generate a plurality of local captured images; a step for receiving remote subject point of view (POV) data from a remote device; a step for selecting a plurality of first tiles from the plurality of local captured images based on the remote subject POV data; and a step for sending local image data to the remote device, the local image data including the plurality of selected first tiles.

In another implementation, a method includes capturing images of a local subject using a plurality of cameras to generate local captured images; selecting a plurality of tiles from the local captured image; and converting the plurality of selected tiles to local subject image data that is usable by a remote device to render and display a visual representation of the local subject, wherein the local subject image data comprises local subject point of view (POV) data that is usable by the remote device to maintain eye gazing between a remote device user and the 3D visual representation of the local subject.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to operations of multiple telepresence devices that may provide sufficient immersion experiences to videoconferencing participants located in different geographical locations. By providing sufficient immersion experiences, the participants may feel the same level of trust and empathy as being face-to-face to each other at the same location, which may reduce or eliminate the needs to travel to be on the same location for a face-to-face meeting. To provide sufficient immersion experiences, the telepresence devices may be operated to display images of a remote participant that preserve a life-like 3D geometry, eye-gazing, etc., of the remote participant. The telepresence device provided at the remote location may provide the same immersive telepresence experience to the remote participant.

Figure 1:
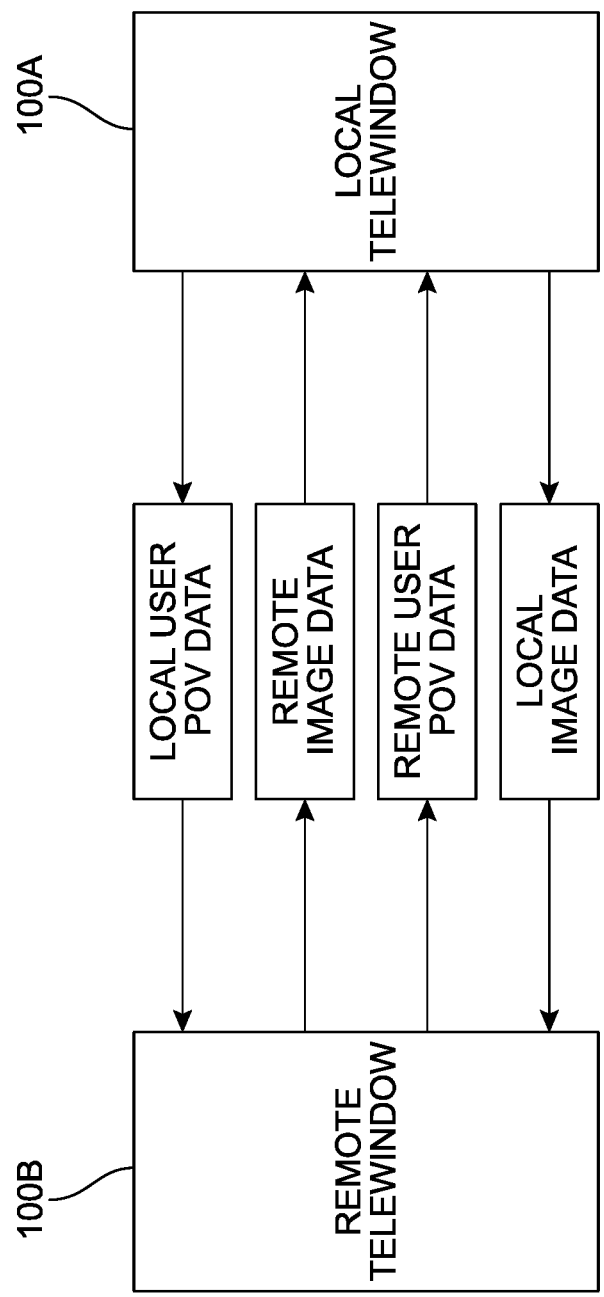
FIG. 1 illustrates a block diagrams showing example operations of and communications between two telepresence devices located at geographically different locations.

FIG. 1 shows a block diagrams showing example operations of and communications between two telepresence devices, for example, a local telepresence device 100A and a remote telepresence device 100B located geographically different locations (concurrently referred to below as telepresence device 100). In some implantations, the telepresence devices 100A, 100B may be constructed to be similar to a window in appearance, and hence are referred to as telewindows in the description below. However, as will be readily apparent from the description below, the operations of the telepresence devices 100A, 100B are widely applicable to various image processing and videoconferencing technologies and are not tied to or limited by any specific situations, configurations or protocols described in this disclosure.

As will be described below in detail, the local telepresence device 100A may include a plurality of cameras to capture a large number of images of a local subject from various spatial positions and perspectives. Similarly, the remote telepresence device 100B may include a plurality of cameras to capture a large number of images of a remote subject 4 from various spatial positions and perspectives. The large number of images can be used to capture and convey realistic images, detailed facial expressions, body languages, emotions, etc. of the subjects, but it would require a large amount of processing power and a significantly bigger bandwidth to process, send and receive all the captured images. Even if even it is possible to send and receive such large amount of data with a reasonable latency, the receiving device would not know how to process all the received images without any instructions or guidelines.

To solve these problems, the local telepresence device 100A may process the captured images to determine and send local subject point of view (POV) data to the remote telepresence device 100B. The local subject POV data may include the local subject's current POV and estimated future POV. The remote telepresence device 100B may use the received local subject POV data to select portions or tiles from the captured remote subject images. The portions or tiles that are found unnecessary may be filtered out and discarded. The remote telepresence device 100B may then send remote image data including the selected portions or tiles to the local telepresence device 100A. Upon receiving the remote image data, the local telepresence device 100A may select some of the portions or tiles included in the remote image data, based on local subject POV data, for example, the current local subject POV. The local window 100A may process the selected portions or tiles from the remote telepresence device 100B to composite an image of the remote subject 4, which may be displayed at the local telepresence device 100A.

The remote telepresence device 100B may be operated in the same or similar manner. For example, the remote telepresence device 100B may send the remote subject POV data to the local telepresence device 100A, which in turn may select portions or tiles from the captured images of the local subject based on the remote subject POV data. The selected portions or tiles from the local telepresence device 100A may be sent to the remote telepresence devices 100B based on the remote subject POV data. The remote telepresence device 100B may then select some of the portions or tiles based on the remote subject POV data, and then composite and display an image of the local subject based on the selected portion or tiles. By using a large number of cameras, for example, two hundred light field cameras, to capture a subject from different spatial positions and perspectives, the telepresence devices 100A, 100B may display more realistic images of a person that preserve the three-dimensional (3D) geometric shape, eye-gazing, etc. and convey the detailed facial expressions, body languages, emotions, etc.

Figure 2A:
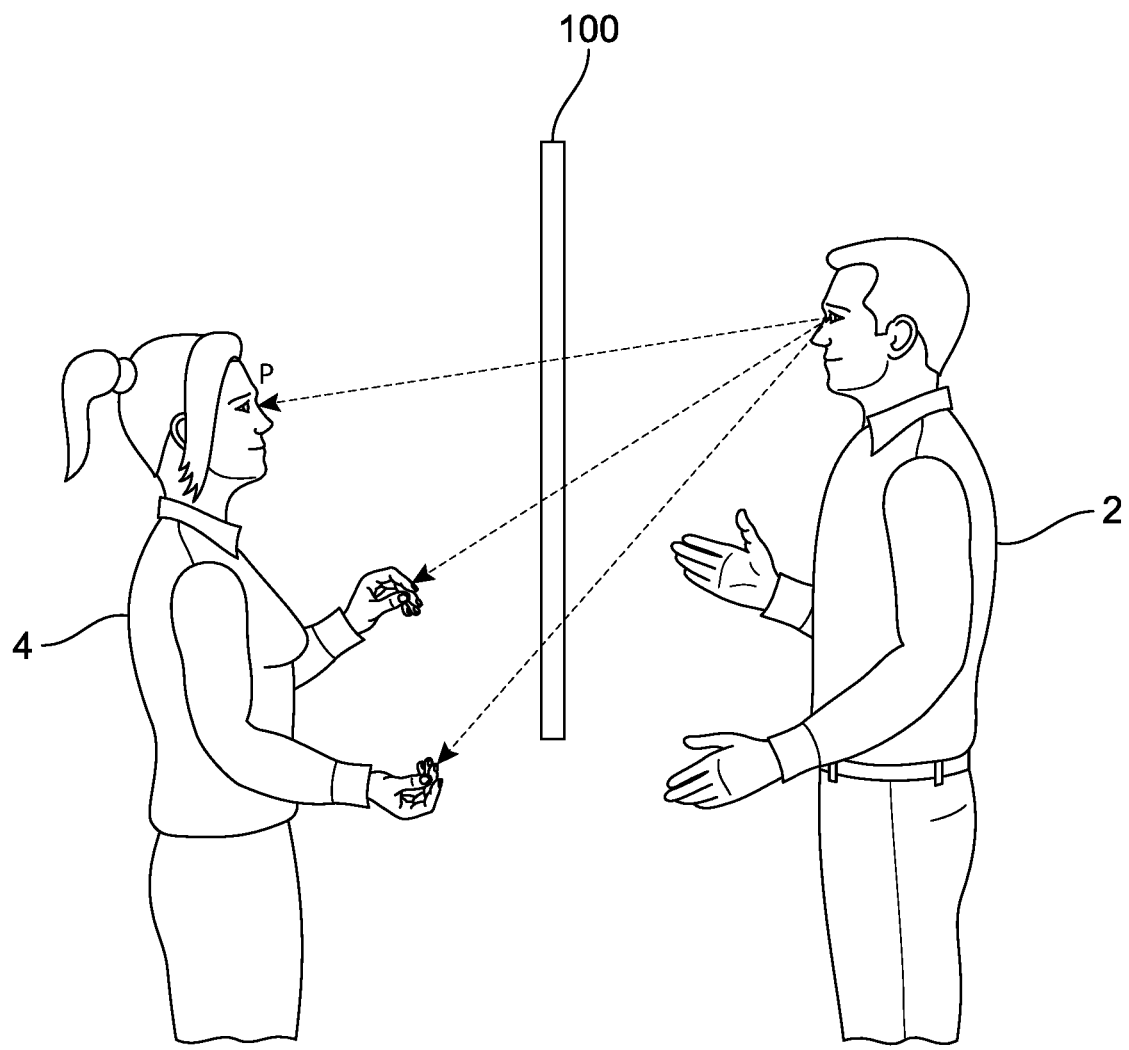
FIG. 2A illustrates two people standing face-to-face at the same geographical location.

FIG. 2A shows a local subject or participant 2 and a remote subject or participant 4 standing face to face at the same geographical location with the telepresence device 100 placed therebetween. Assuming that the telepresence device 100 is not present, the visual image of the remote subject 4 perceived by the local subject 2 is a constantly moving subject, of which the three-dimensional (3D) geometric shape is varied by, for example, the distance between the local and remote subjects 2, 4, the eye location/height of the local subject 2, the fields of view (FOV) of the local subject 2, etc. When a camera (not shown) is used to capture the image of the remote subject 4, an ideal location for capturing the most similar image of the remote subject 4 as seen by the local subject 2 would be the eye location of the local subject 2. However, as discussed above, due to the inherent angular resolution or diffraction limitations of a camera lens, no single camera can capture the same or similar images of the remote subject 4 that preserve the same 3D geometric shape and eye gazing of the remote subject 4 as seen by the local subject 2 regardless of where such camera is positioned and how such camera is angled to replicate the eye gazing of the local subject 2. Also, the eye location and eye gazing direction of the local subject 2 constantly change, and it is practically impossible to move a camera as freely as a human's eye movement. A pair of eye glasses or a VR headset equipped with a camera may be used to track the eye location and eye gazing direction of the local subject 2, but it requires the local subject 2 to wear an additional piece of equipment that needs to be precisely calibrated to correctly function with the telepresence device 100.

Figure 2B:
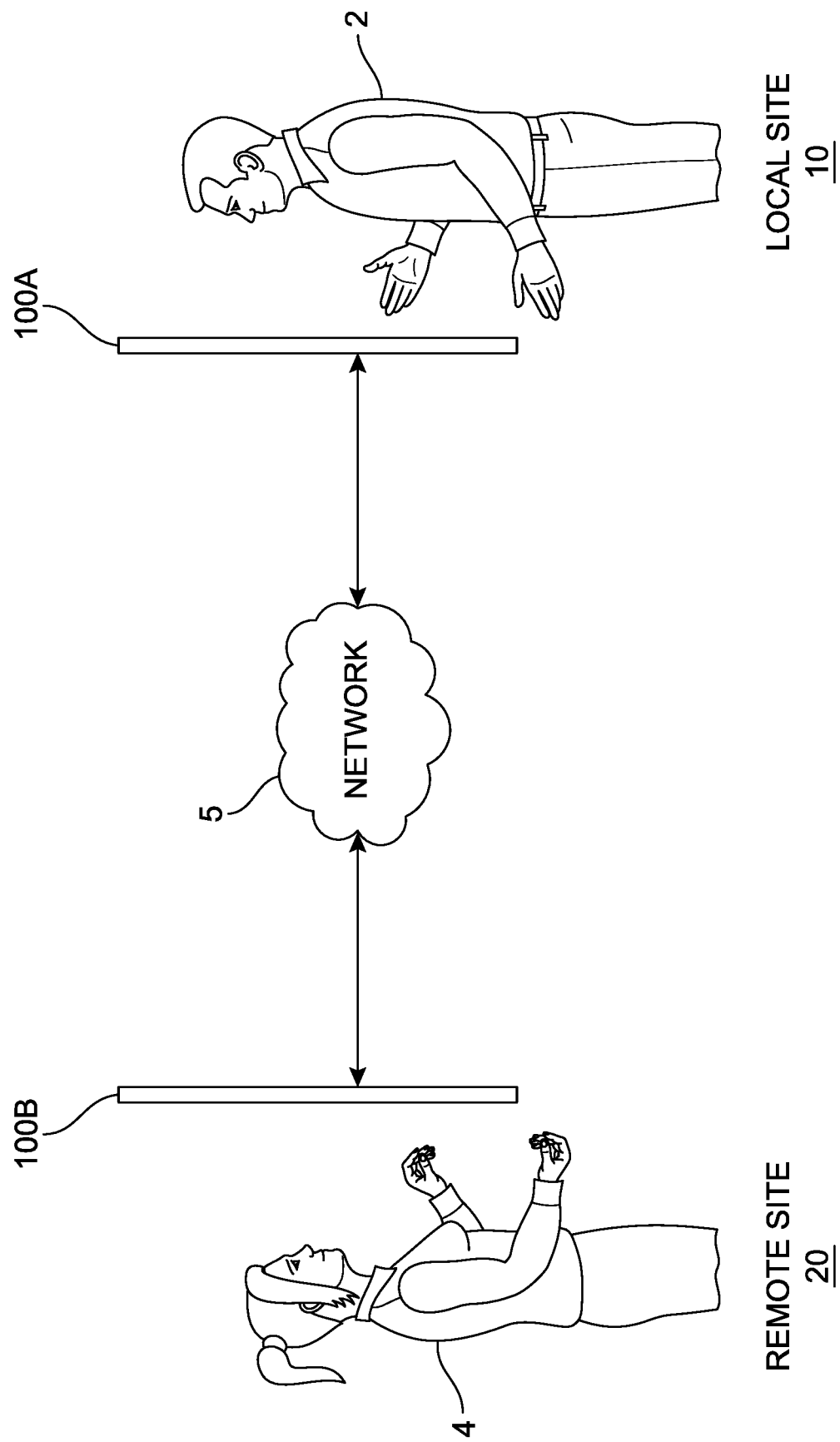
FIG. 2B illustrates the two people of FIG. 2A located at geographically different locations and conducting a video-conference using the local and remote telepresence devices of FIG. 1.

FIG. 2B shows the local subject 2 and the remote subject 4 located at two geographically different locations, for example, a local site 10 and a remote site 20, respectively. The local subject 2 at the local site 10 is also referred to as a local participant. The remote subject 4 at the remote site 20 is also referred to as a remote participant. Two telepresence devices 100, for example, a local telepresence device 100A and a remote telepresence device 100B, are located at the local and remote sites 10, 20, respectively. The local and remote telepresence devices 100A, 100B may be communicatively linked via a network 5, which may be a wired network, a wireless network, or a combination thereof. As will be described in more detail in later examples, the telepresence devices 100A and 100B may be constructed such that an image of the remote subject 4 is displayed on the local telepresence device 100A. Similarly, the remote telepresence device 100B may be constructed to display an image of the local subject 2. The images displayed by the telepresence devices 100A, 100B may preserve, for example, the 3D geometric shape, the eye gazing, etc., of the remote and local subjects 2, 4, respectively, such that the local and remote subjects 2, 4 may mutually feel the same or similar level of trust and empathy as being face-to-face at the same location. The telepresence devices 100A, 100B may not require the local and remote subjects 2, 4 to use or wear any additional pieces of equipment, such as, e.g., a pair of eye glasses, a VR set, or the like, which could alter the appearance and impression of the local and remote subjects 2, 4.

Figure 3:
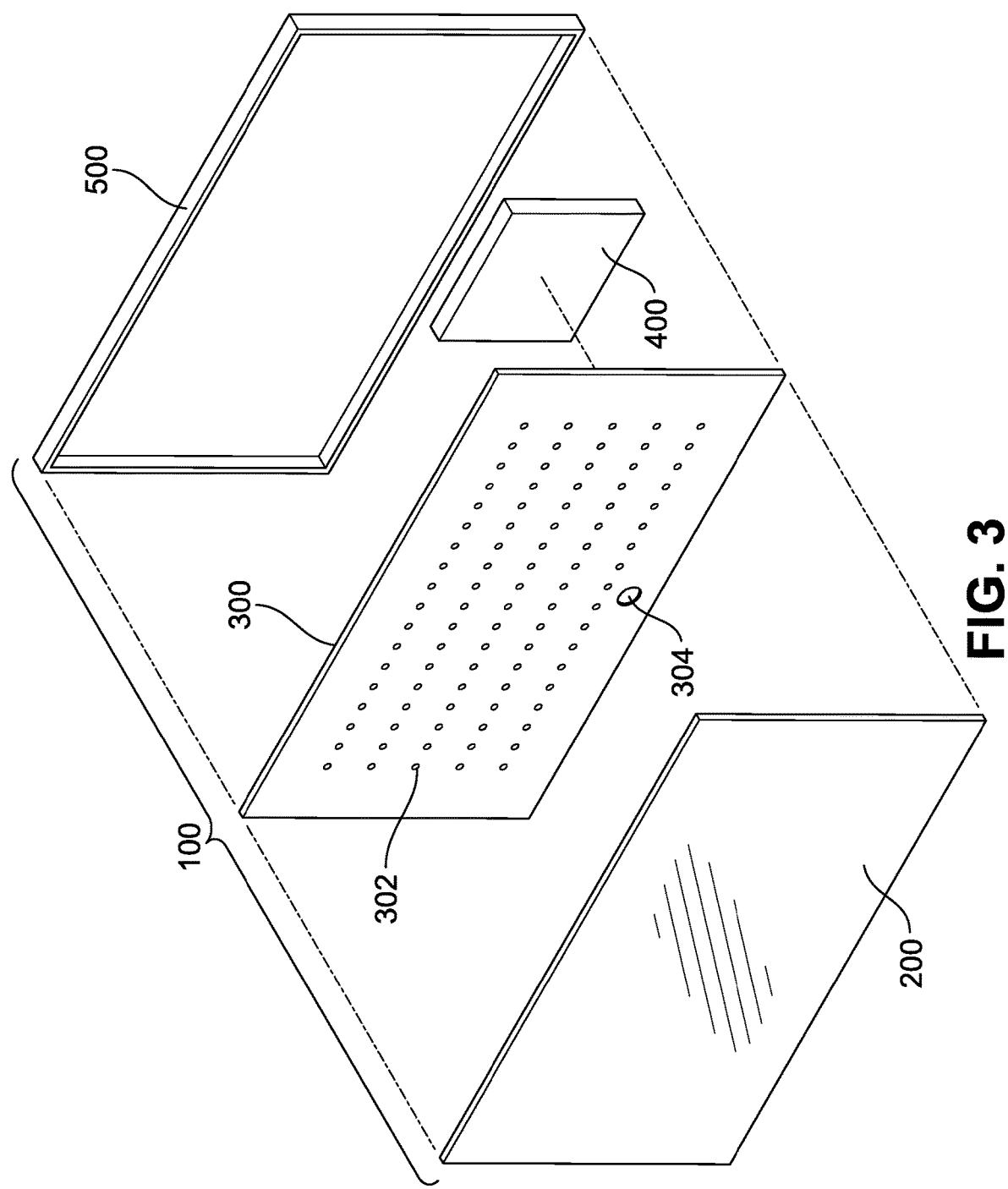
FIG. 3 illustrates an explode view of an example telepresence device.

FIG. 3 shows an exploded view of an example of the local telepresence device 100A shown in FIG. 2B. The remote telepresence device 100B may be constructed in the same or a similar manner. The local telepresence device 100A may include, for example, a display 200, a camera array 300, a controller 400, an enclosure 500, etc. The display 200 may be transparent, semitransparent or partially opaque such that light rays can pass therethrough. For example, the display may be an organic light-emitting diode (OLED) display or other light-emitting diode type displays. The display 200 may have front and rear main surfaces, which may in the form of a vertical plane. The front main surface of the display 200 may be constructed to face the local subject 2 (shown in FIG. 2) and display video images to the local subject 2. The camera array 300 may be arranged to face the rear surface of the display 200 such that the light rays reflected by the local subject 2 and the background subjects are passed through the display 200 and captured by the camera array 300.

The camera array 300 may include a plurality of cameras 302 that face the display 200 to capture the light rays passing therethrough. The cameras 302 may include light field cameras that capture light field information emanating from a scene, including the intensity and directions of light rays in a scene. In some examples, some or all of the light field cameras 302 may be positioned behind the display 200 to capture images from the light received through the display 200. By placing the light field cameras 302 behind the display 200, subject gazes may generally be oriented more towards the light field cameras 302, greater numbers of the light field cameras 302 may be more easily included, the light field cameras 302 may be arranged to capture images of a subject (e.g., the local subject 2 in FIG. 2B) from more natural angles, and an additional non-display user-facing surface (such as a bezel) may not be necessary for the local telepresence device 100A. The light field cameras 302 may be positioned such that, when the local telepresence device 100A is operated, a leftmost camera 302 and a rightmost camera 302 may span a horizontal distance that is at least large enough, in most conditions, to capture a view around the local subject 2 located close to and within a field of view (FOV) of one or more of the light field cameras 302. Various other arrangements and numbers for the light field cameras 302 are also effective, such as, but not limited to, an array, along multiple parallel lines, or along perpendicular lines.

The light field cameras 302 may be evenly spread out with a predetermined distance therebetween. Alternatively, the light field cameras 302 may be more densely placed at a certain area to capture more visual information. For example, an area of the camera array 300 that is expected to capture a main or closer subject, e.g., the local subject 2, may be provided with more light field cameras 302. The rest of the camera array 300 expected to capture a background or farther subject may be provided with less light field cameras 302.

In addition to the light field cameras 302, the camera array 300 may include a plurality of depth cameras 304). The depth cameras 304 may be provided proportional to the light filed cameras 302. For example, the light field cameras 302 and the depth cameras 304 may be provided at a constant ratio (e.g., 1:1, 3:1, 8:1, etc.). The depth cameras 304 may include an array of IR structured-light scanners. Each IR structured-light scanner projects, through the display 200, a narrow band of light onto a 3D shaped surface of a subject and produce a line of illumination of the subject that can be collectively used for grayscale geometric reconstruction of the subject's surface shape and estimating the distance between the 3D scanner and subject.

Some or all of the depth cameras 304 may be positioned behind the display screen 200 to capture light for depth estimation through the display 200, as illustrated in the example of FIG. 3. By placing the depth camera 304 behind the display 200, greater numbers of the depth cameras 304 may be more easily included, and an additional non-display user-facing surface may not be necessary for the depth cameras 304. A depth estimate may also be referred to as an "estimated depth," "distance estimate," or "estimated distance." As described in more detail below, depth estimates obtained using the depth cameras 304 may be used to, among other things, determine when a subject has come into proximity to the local telepresence device 100A, determine a distance between the local telepresence device 100A and a subject, determine a position of a subject relative to the camera array 300, and/or identify discontinuities in a depth image and related depth image data used to perform image segmentation for a subject.

As known in the art, the maximum distance between the cameras 302 that does not cause aliasing artifact is a function of the minimum and maximum depth (or distance) of an object from the cameras 302. For example, where $\delta$; is a camera angular resolution of a pixel, D the distance between adjacent cameras, and $Z_{min}$ and $Z_{max}$ the bounds of Z depth of a scene:

$$D = \frac{2\delta}{Z_{min}^{-1} - Z_{max}^{-1}} \quad (1)$$

$$Z_{max} = \frac{D}{\frac{D}{Z_{min}} - 2\delta} \quad (2)$$

With cameras having a vertical FOV of 90 degrees and a vertical resolution of 1080 pixels, $Z_{min}$=400 mm, $Z_{max}$=1000 mm, and a camera array size of 600 mm×600 mm, the cameras 302 would be spaced at an interval of 1.9 mm, requiring a total number of about 96,000 cameras. However, by estimating depth information (for example, by use of the depth cameras 304) the number of the cameras 302 may be significantly reduced. For example, if one of 16 different depth levels is assigned to each pixel, then the spacing between cameras 302 may be increased to an interval of 30 mm, substantially reducing the total number of cameras 302 to about 400 cameras for the same 600 mm×600 mm area. Examples of such approaches are described in Zhouchen Lin and Heung-Yeung Shum. "A geometric analysis of light field rendering." International Journal of Computer Vision 58.2 (2004): 121-138, which is incorporated by reference herein in its entirety.

The controller 400 may include a logic subsystem, a data holding subsystem, a display controller, and a communications subsystem, and may be communicatively coupled to the display 200 and the camera array 300. The logic subsystem may include, for example, one or more processors configured to execute instructions and communicate with the other elements of the local telepresence device 100A according to such instructions to realize various aspects of this disclosure involving the local telepresence device 100A. Such aspects include, but are not limited to, configuring and controlling the other elements of the local telepresence device 100A, input and commands, communicating with other computer systems, and/or processing images captured by the camera array 300. The data holding subsystem may include one or more memory devices (such as, but not limited to, DRAM devices) and/or one or more storage devices (such as, but not limited to, flash memory devices). The data holding subsystem may include one or more media having instructions stored thereon which are executable by the logic subsystem, which cause the logic subsystem to realize various aspects of this disclosure involving the local telepresence device 100A. Such instructions may be included as part of firmware, an operating system, device drivers, application programs, or other executable programs. The communications subsystem may be arranged to allow the local telepresence device 100A to communicate with other computer systems. Such communication may be performed via, for example, wired or wireless data communication.

The enclosure 500 may be arranged to be mechanically coupled to the display 200 and enclose internal components of the local telepresence device 100A, including the camera array 300 and controller 400. The enclosure 260 may also be referred to as a "housing." When the local telepresence device 100A is assembled, the camera array 300 and the controller 400 may be all encapsulated by the single enclosure 500 and positioned behind the display 200. Alternatively, various elements and features of the local telepresence device 100A may be implemented across multiple devices. For example, a portion of the controller 300 may be provided by a computer system not enclosed by the enclosure 500, at least some of the cameras 302 and the depth cameras 304 may be included in one or more separate devices instead of being positioned behind the display 200, and/or at least some of the depth cameras 304 may be included in one or more separate devices instead of being positioned behind the display 200.

The camera array 300 may be constructed to any number of the light field cameras 302 and/or the depth cameras 304. However, when the camera array 300 is constructed with a large number of light field cameras 302, it may require a large number of data buses to transmit the image data captured by the light field cameras 302 and a large amount of data processing power to encode and process the captured image data, which may complicate the design and production of the local telepresence device 100A and may generate a large amount of heat without a proper cooling system. To alleviate these problems, the camera array 300 may be constructed by assembling a number of smaller image capturing units or modules.

Figure 4A:
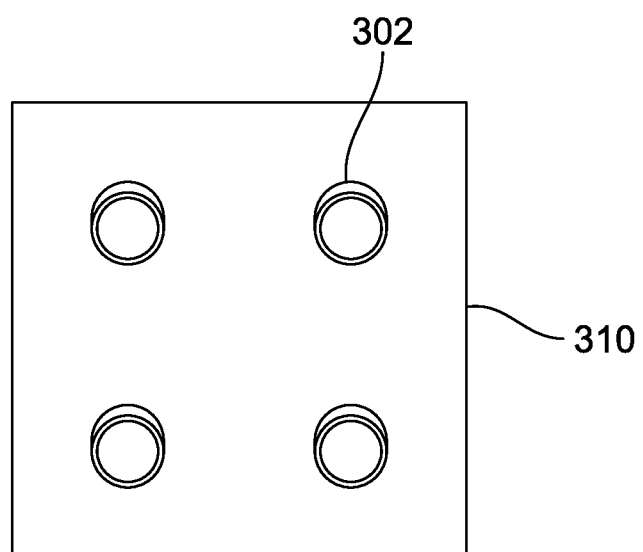
FIGS. 4A and 4B illustrate an example camera module of the telepresence device illustrated in FIG. 3.

FIG. 4A illustrates an example of a camera module 310, which may include one or more light field cameras 302. In some implementations, some or all of the camera modules 310 may include one or more light field cameras 302 only, one or more depth cameras 304 only, or a combination of one or more light field cameras 302 and one or more depth cameras 304. Although the camera module 310 shown in FIG. 4A include four (4) light field cameras 302 arranged a 2×2 array, the camera module 310 may be constructed to have a different number of light field cameras 302 and/or depth cameras 304 arranged in different numbers of rows and columns with different distances therebetween. For example, a camera array 300 including four hundred (400) light field cameras 302 arranged in a 20×20 array may be constructed by arranging twenty five (25) cameral modules 310 in a 5×5 array, where each camera module 310 has sixteen (16) light field cameras 302 arranged in a 4×4 array.

In some implementations, at least some of the light filed cameras 302 may be tilted to capture a broader area of the subject, such as, for example, the top surfaces of the head and shoulder, the side surfaces of the head, arms and legs, etc. of the local subject 2. For example, as shown in FIG. 4A, the light field cameras arranged on the top and horizontal center of the display array 300 may be tilted downward, to capture the top surfaces of the head and shoulders of the local subject 2. An example image captured by the down-tilted light field camera 302 located at the top and horizontal center of the display array 300 is shown as an image 60A in FIG. 6. The light field cameras 302 may be tilted in different directions. For example, the light field cameras 302 located at left and right sides may be tilted toward the center of the camera array 300, and the light field cameras 302 located at the corners of the camera array 300 may be tilted diagonally toward the center of the camera array 300. The light field cameras 302 may also be tilted at varying degrees depending on their distances from the center of the camera array 300. For example, the greater the distance from the center of the camera array 300 to the light field camera 302 is, the greater the tilted angle of the light filed camera 302 may be.

In some implementations, the plurality of light field cameras 302 may be implemented with a view camera system. An example view camera system is shown and described in U.S. Pat. No. 7,495,694, titled "OMNI-DIRECTIONAL CAMERA WITH CALIBRATION AND UP LOOK ANGLE IMPROVEMENTS," issued on Feb. 24, 2009, which is incorporated herein by reference in its entirety. In a view camera system, an image sensor is mounted flat on a printed circuit board (PCB) and a corresponding lens is mounted on the image sensor. Instead of tilting the image sensor and lens together, in the view camera system, the lens is horizontally shifted such that the centers of the image sensor and lens are offset from each other, which in turn tilts the optical axis of the image sensor and lens combination. By controlling the horizontal shift direction and distance, the optical axis may be tilted at a desired up-look angle while ensuring that the image is completely captured by the sensor. In the view camera system, the image sensors do not need to be held above a surface at a tilted angle to achieve the desired tilt angle. Hence, the camera array 300 may be designed and manufactured in a simpler manner, and camera misalignment may be substantially reduced.

Figure 4B:
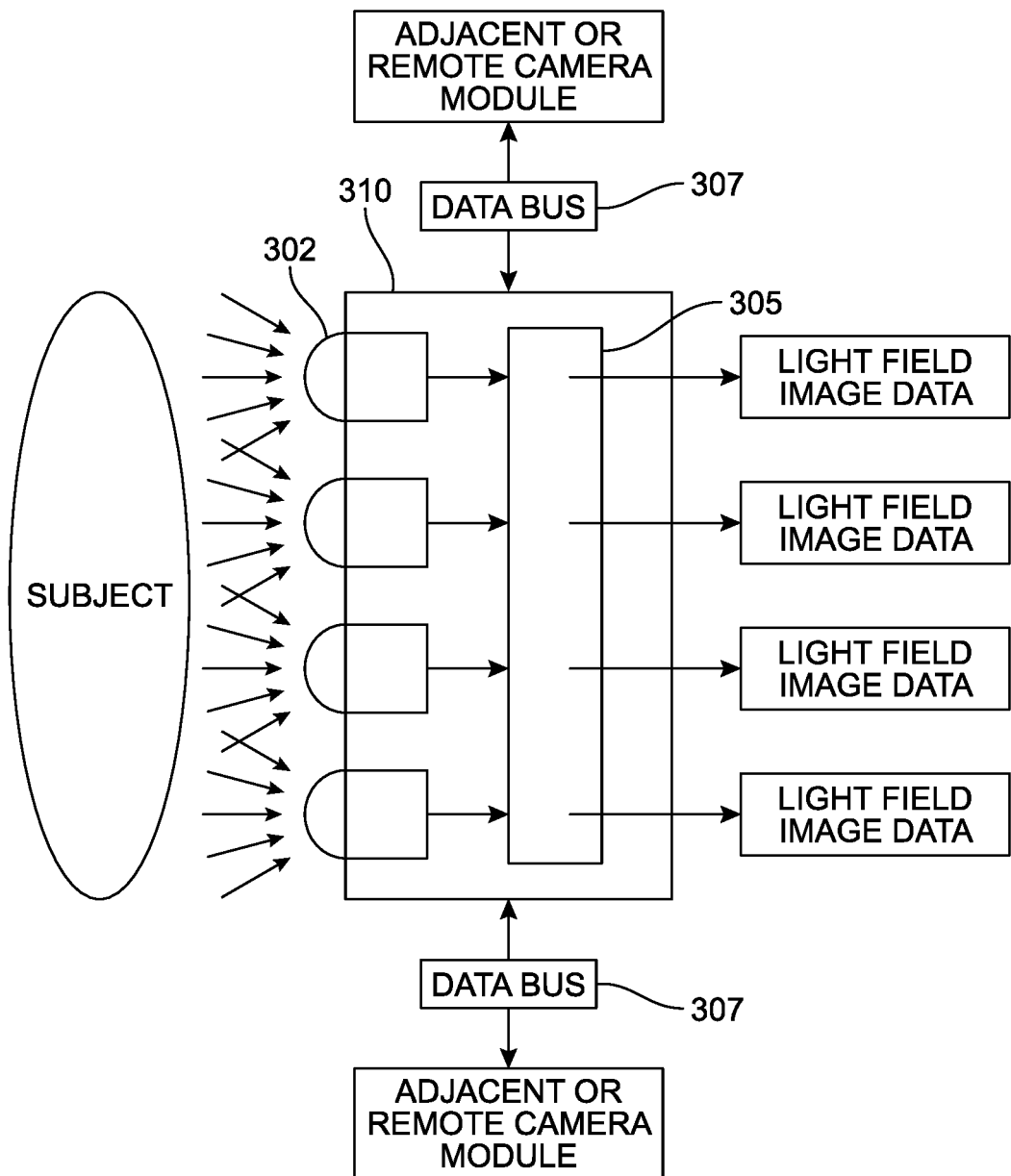

In some implementations, the camera module 310 may include one or more image processors 305, as illustrated in FIG. 4B. The image processor 305 may process the light field image data captured by the four (4) light field cameras 302. In some implementations, the image processor 305 may analyze and compare the captured light field images to construct light field image data. In doing so, the image processor 305 may filter out at least some of the captured light field image data that is redundant or unnecessary for constructing light field image frames. In other implements, each light field camera 302 or a pair or group of light field cameras 302 may be provided with its own designated image processor (not shown). The designated image processor may be provided in addition to the image processor 305 to share the processing burden of the image processor 305. For example, the designated processors may filter out redundant or unnecessary light field images, and the image processor 305 may construct and output a stream of light field image frames. Various The camera array 310 may be configured with a field-programmable gate array (FPGA), a system on a chip (So) or other integration solutions.

In some implementations, the camera module 310 may be in communication with one or more other camera modules located adjacently or remotely via one or more data buses 307. For example, two camera modules 310 that are located at both horizontal, vertical or diagonal end portions of the camera array 300 may be in communication with each other via the data bus 307 to share the light field images captured from different points of view. Such shared light field images may then be processed by the image processor 305 to create light field images of the subject.

In some implementations, the light field cameras 302 and/or the image processor 305 may be in communication with the depth camera 304 (shown in FIG. 3). As described above, the depth camera 304 may provide the depth estimation of a subject. When the depth estimation of a subject is available, the light field cameras 302 may be positioned further from each other and still achieve the same or similar level of light field image capturing accuracy. Hence, the depth camera 304 may contribute to reducing the number of the light field cameras 302 required to construct the camera array 300. The image processor 305 also may use the depth estimation to filtering out the redundant or unnecessary light field image pixel, tile or fame data.

Figure 5:
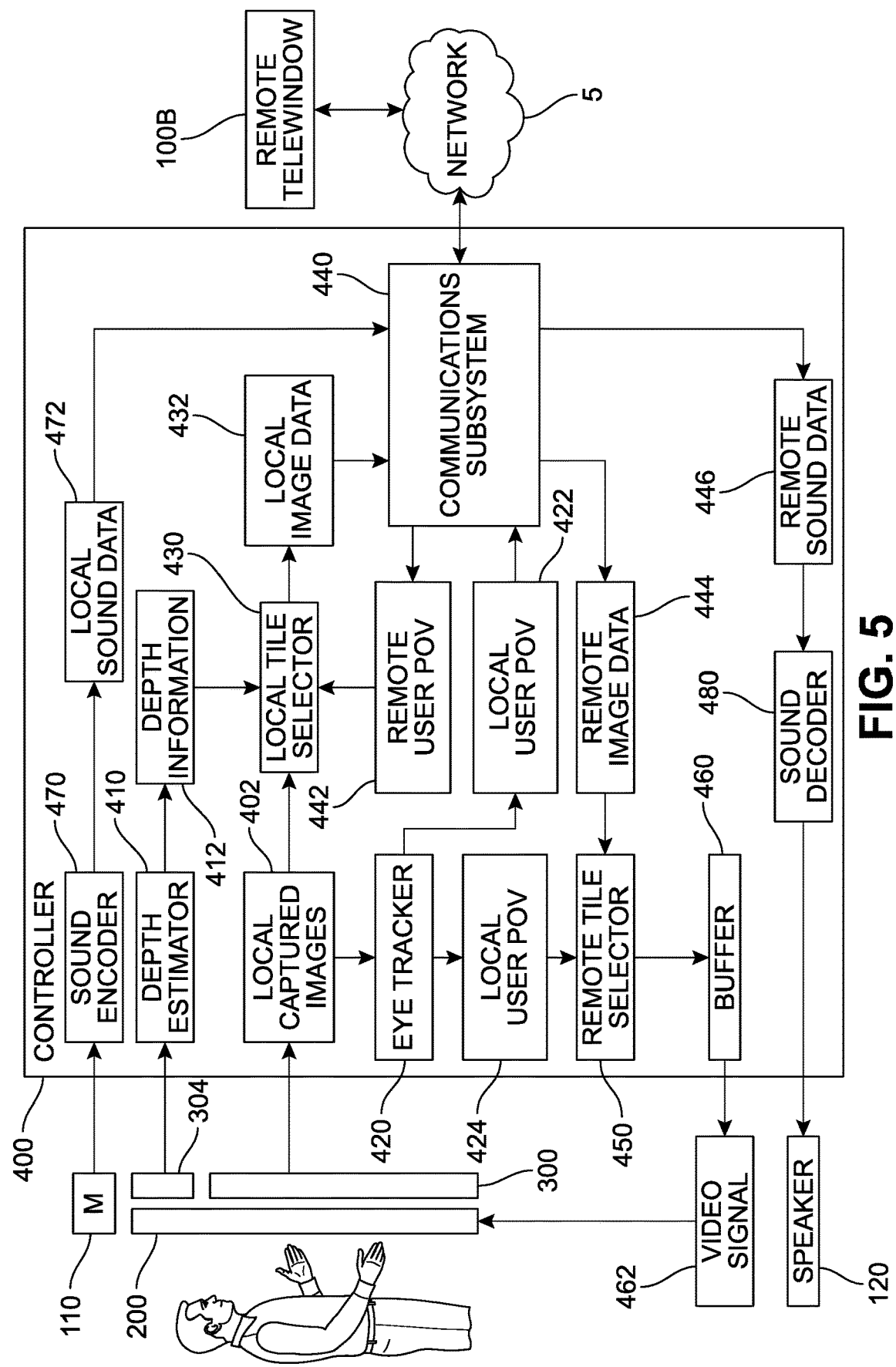
FIG. 5 illustrates an example controller of the telepresence device illustrated in FIG. 3.

FIG. 5 illustrates an example schematic diagram showing features included in an example controller 400 implementing various features described herein. The controller 400 may include any of the features described above for the telepresence devices 100A, 100B shown in FIG. 2B. Although aspects of features illustrated in FIG. 5 may be described with a focus on being applied to generate one current frame image, it is understood that these features would be similarly applied to generate additional frame images, such as a series of frame images for a telepresence videoconferencing stream.

The controller 400 may include, for example, a depth estimator 410, a POV tracker 420, a local tile selector 430, a communications subsystem 440, and a remote tile selector 450. The depth estimator 410 may generate and output depth information 412 of the subjects on the local site 10, including the local subject 2. In some implementations, the depth estimator 410 may be connected to one or more depth cameras 304 (shown in FIG. 3) to receive the depth estimations of the local subject 2. The POV tracker 420 and the local tile selector 430 may receive local captured images 402 captured by the camera array 300. In some implementations, the local captured images 402 may include a stream of light field frame images captured by each light field camera 302, which may be output via a corresponding camera module 310.

Figure 6:
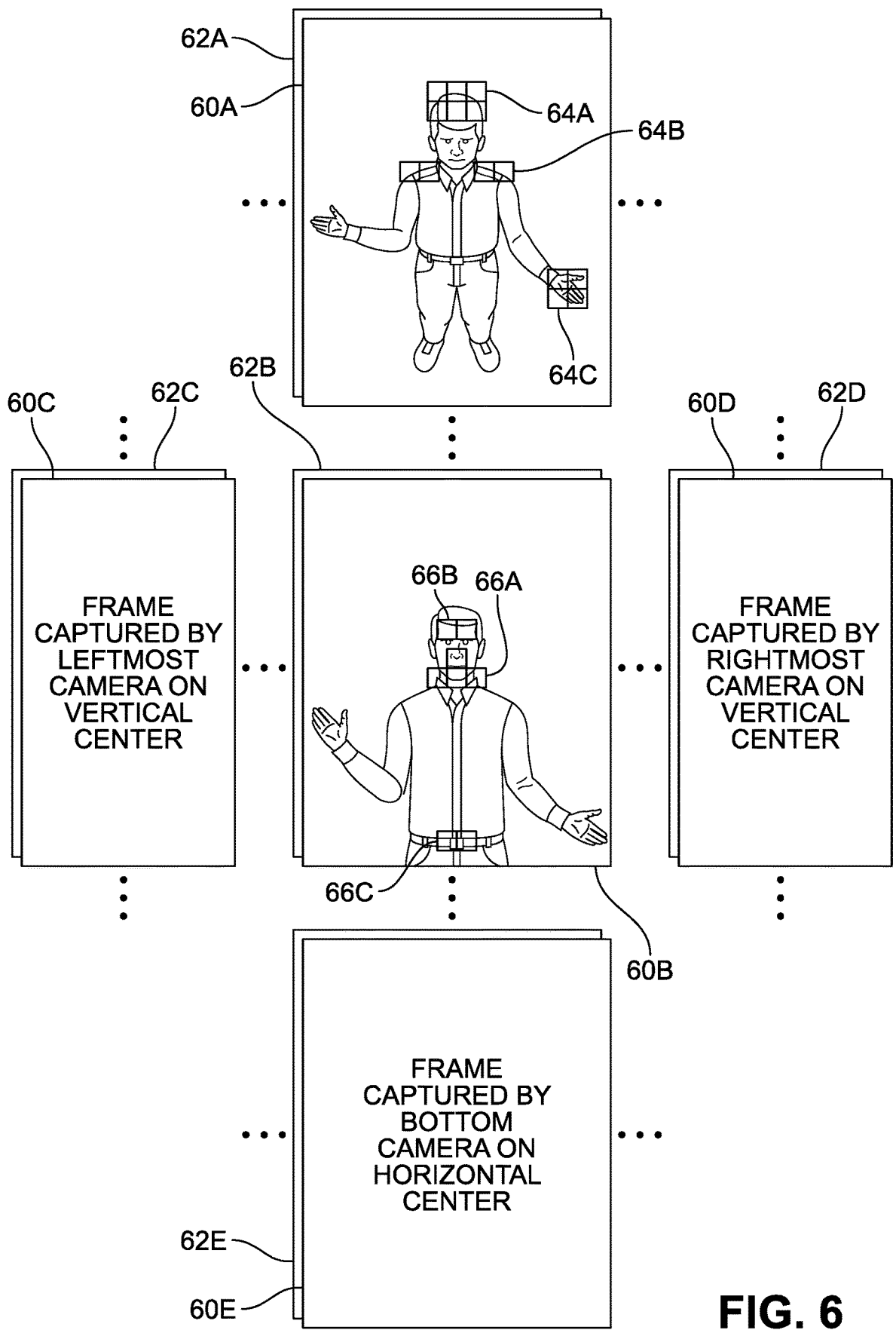
FIG. 6 illustrates example frame images captured by a camera array of the telepresence device illustrated in FIG. 4.

FIG. 6 illustrates examples of the local captured images 402 captured by each light field camera 302. As described above, the local captured images 402 may include a stream of sequential light field frame images captured by each light field cameras 302, which may be output in a digital video signal format via the camera modules 310. The frame images 60A, 60B, 60C, 60D, 60E (concurrently referred to as previous frame images 60) are example visual representations of the light field image frames captured in the previous sampling cycle by the light field cameras 302 located at the top and horizontal center, horizontal and vertical center, leftmost and vertical center, right most and vertical center, and bottom and horizontal center of the camera array 300, respectively. The frame images 62A, 62B, 62C, 62D, 62E (concurrently referred to as current light field frame images 62) represent example light field image frames captured in the current sampling cycle by the aforementioned light field cameras, respectively.

The image frames 60A, 62A are two sequential image frames of a continuous image frame stream generated by the light field camera 302 located at the top and horizontal center of the camera array 300. Similarly, the image frames 60B, 62B are two sequential image frames of a continuous image frame steam generated by the light field camera 302 located at the vertical and horizontal center of the camera array 300. As seen in FIG. 6, the image frame 60A shows top surfaces of the head, shoulder, shoes, etc. of the local subject 2, which the image frame 60B does not show. These unique portions of the image frame 60A may be selected or discarded to composite an image of the local subject 2 at the remote telepresence device 100B based on the POV of the remote subject 4, which will be discussed below in detail.

Referring back to FIG. 5, the POV tracker 420 may process and analyze the local captured images 402 to track the POV of the local subject 2 to determine the current POV of the local subject 2 and to estimate one or more future POVs of the local subject 2. The current and estimated future POVs are collectively referred to as local subject POV data 422 in FIG. 5.

Figure 7A:
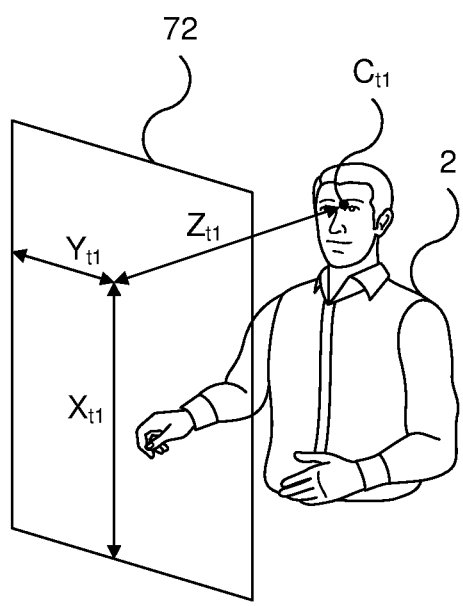
FIGS. 7A, 7B, 7C, 7D, 7E, 7F and 7G illustrate steps for determining current and future point of view (POV) data of the local subject.

FIGS. 7A, 7B, 7C, 7D, 7E, 7F and 7G illustrate an example method for tracking a current POV and estimating one or more future POVs of the local subject 2, which may be performed by the POV tracker 420. It is noted that that the movements of the local subject 2 shown in FIGS. 7A, 7B, 7C, 7D, 7E, 7F and 7G are exaggerated for purposes of clarity and discussion, and do not necessarily reflect expected actual degrees of movement. In FIG. 7A, at a time t1, the POV tracker 420 may determine a location of a first POV point $C_{t1}$ of the local subject 2 relative to the local telepresence device 100A for the time t1. In the illustrated example, the first POV point $C_{t1}$ is described in terms of a three-dimensional Cartesian coordinate $(X_{t1}, Y_{t1}, Z_{t1})$ relative to a lower right position of the local telepresence device 100A from the view of the local subject 2. The X-Y plane 72 in this example is parallel to the front main surface of the display 200. It is noted that various other coordinate systems may be employed to similar effect. A POV point, such as the first POV point $C_{t1}$, may be a point between the eyes of the local subject 2 (as illustrated in FIG. 7A), a left eye of the local subject 2, a right eye of the local subject 2, or other location corresponding to a viewpoint of the of the local subject 2.

Figure 7B:
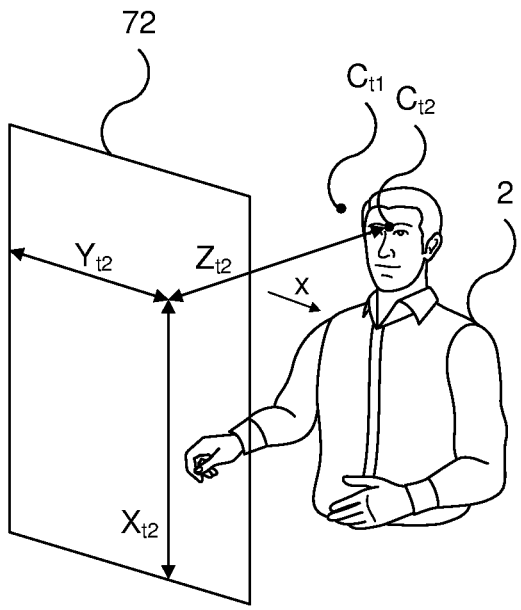

In FIG. 7B, at a time t2, the local subject 2 has moved from the position at time t1 in FIG. 7A; for example, laterally to the left as indicated by arrow X. For the time t2, the POV tracker 420 may determine a location of a second POV point $C_{t2}$ of the local subject 2 relative to the local telepresence device 100A, with a corresponding three-dimensional coordinate $(X_{t2}, Y_{t2}, Z_{t2})$, much as described in FIG. 7A.

Figure 7C:
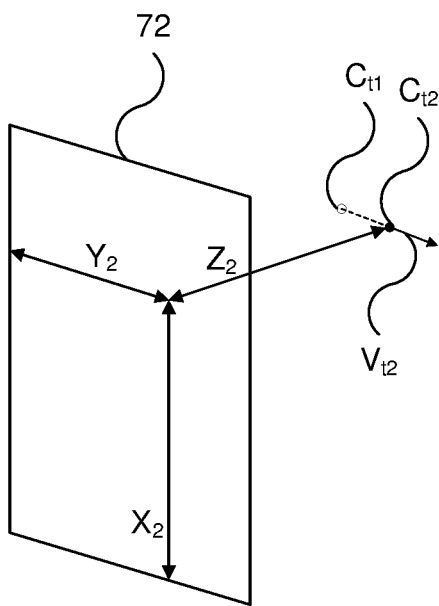

In FIG. 7C, also corresponding to the time t2, the local telepresence device 100A generates, based on movement of a POV point of the local subject 2 over time, motion prediction data suitable for estimating or predicting future locations of the POV point of the local subject 2. In this example, the motion prediction data includes the second POV point $C_{t2}$ of the local subject 2 (the most recently determined location for the POV point of the local subject 2) and a motion vector $V_{t2}$, calculated based on and reflecting the movement from the first POV point $C_{t1}$ to the second POV point $C_{t2}$; for example, the motion vector $V_{t2}$ might be calculated as a difference between the first POV point $C_{t1}$ and the second POV point $C_{t2}$. The motion vector $V_{t2}$ may be expressed in terms of the same coordinate axes used for the second POV point $C_{t2}$. Although the example illustrated in FIG. 7C uses a linear motion vector $V_{t2}$ for motion prediction data, in other examples more complex motion prediction models, and corresponding motion prediction data, may be generated. The local telepresence device 100A transmits the generated motion prediction data to the remote telepresence device 100B.

Figure 7D:
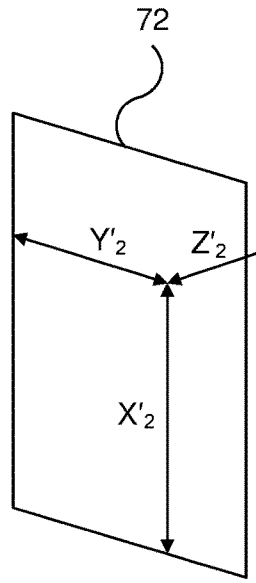

In FIG. 7D, at a time t3, the remote telepresence device 100B has received the motion prediction data from the local telepresence device 100A. In this example, the second POV point $C_{t2}$ and is converted to a coordinate system used by the remote telepresence device 100B (for example, orthogonal axes X', Y, and Z'), resulting in a three-dimensional coordinate $(X'_{t2}, Y'_{t2}, Z'_{t2})$. In some examples, offsets may be applied to one or more components of the coordinate $(X_{t2}, Y_{t2}, Z_{t2})$ to generate the coordinate $(X'_{t2}, Y'_{t2}, Z'_{t2})$. In some examples, a matrix transformation or other transformation may be applied to the coordinate $(X_{t2}, Y_{t2}, Z_{t2})$ to generate the coordinate $(X'_{t2}, Y'_{t2}, Z'_{t2})$.

Latency between the movements of the local subject 2 and images presented by the local telepresence device 100A to the local subject 2 becomes perceptible at around 30 milliseconds, although the amount at which it becomes perceptible may vary from person to person. To minimize this latency, portions of the image data captured by the remote telepresence device 100B at the time t3 are selected for rendering a light field image corresponding to a POV position of the local subject 2 at a future time corresponding to the display of the image data to the local subject 2, such as the time t9 illustrated in FIG. 7F. However, there are a number of sources of uncertainty for where that future POV position actually will be. For example, network latency in transmitting image data from the remote telepresence device 100B to the local telepresence device 100A may vary as a result of a number of unknown circumstances. Additionally, the actual movements of the local subject 2 may diverge from the motion prediction data generated at the time t2; for example, although the local subject 2 may move linearly along the motion vector $V_{t2}$, that movement may be faster or slower than predicted.

Figure 7E:
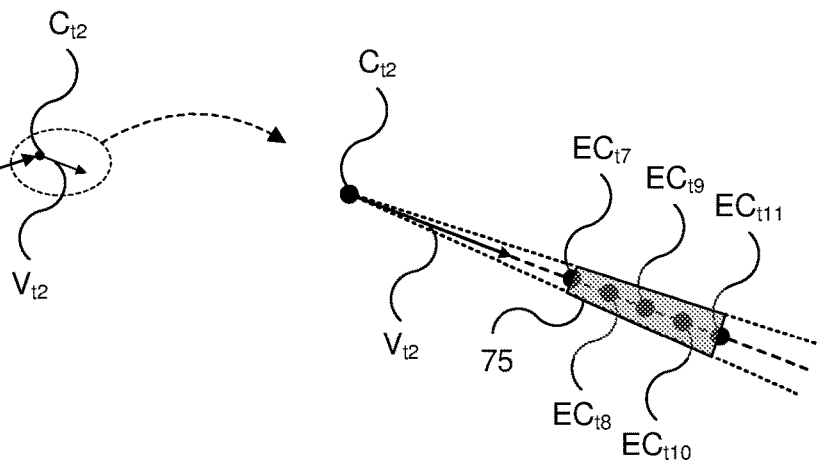

To address the uncertainty in the actual future POV position that will occur when the image data is rendered by the local telepresence device 100A, the remote telepresence device 100B identifies multiple POV positions corresponding to various possible POV positions, and selects portions the image data that would be used by the local telepresence device 100A to render an image corresponding to each of the multiple POV positions. FIG. 7E illustrates an example in which five POV positions are identified by the remote telepresence device 100B based on the motion prediction data received from the local telepresence device 100A. Based on the second POV point $C_{t2}$ and the motion vector $V_{t2}$, future POV positions for the local subject 2 are estimated or predicted for times t7, t8, t9, t10, t11, resulting in respective estimated POV points $EC_{T7}$, $EC_{T8}$, $EC_{T9}$, $EC_{T10}$, $EC_{T11}$. For example, the time t9 may correspond to an expected time the image data will be used by the local telepresence device 100A, and times t7 and t8 being slightly earlier than t9, and times t10 and t11 being slightly later than time t9. These five POV points may then be used to select image data for transmission to the local telepresence device 100A.

Further, there may be uncertainty or error in the motion prediction data generated at the time t2 and/or the local subject 2 may make an unexpected or unpredictable movement that does not coincide with the motion prediction data. To better ensure that the selected portions of the image data include the image data needed to render POV positions that deviate from the motion prediction data, a broader range of future POV positions may be identified and used for selecting the portions of the image data transmitted to the local telepresence device 100A. In FIG. 7E, a volume 75 is shown, from which multiple representative POV points are selected and used for selecting portions of the image data transmitted to the local telepresence device 100A. In the example illustrated in FIG. 7E, the volume 75 is a portion of a cone extending from the second POV point $C_{t2}$ corresponding to times t7 through t11, which widens over time to reflect increasing uncertainty over time in the actual POV position of the local subject 2 and provides a volume more certain to encompass POV positions within a degree of uncertainty. With this, the amount of image data transmitted to the local telepresence device 100A will likely increase, but it also allows operation of the local telepresence device 100A to be more robust against unexpected movements of the local user 2.

It is noted that although in the above examples the remote telepresence device 100B calculated future POV points and/or volume 75, in some implementations such calculations may instead be performed by the local telepresence device 100A. For example, the motion prediction data generated by the local telepresence device 100A may expressly specify POV points, a range of POV points, and/or a volume of POV points to be used by the remote telepresence device 100B for selecting portions of image data. However, by providing more freedom to the remote telepresence device 100B to identify the future POV positions, it allows that selection to better dynamically accommodate situations such as changes network latency observed between the local telepresence device 100A and the remote telepresence device 100B.

Figure 7F:
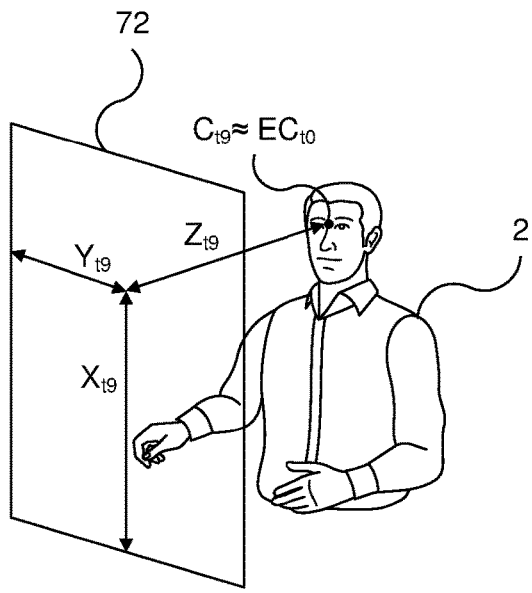

In FIG. 7F, at a time t9 and based on an actual POV point $C_{r9}$ determined for the time t9, the local telepresence device 100A may use a subset of the image data received from the remote telepresence device 100B to render and display an image of the remote subject 4 corresponding to the POV point $C_{r9}$. Although the image data was captured at an earlier time t3, by rendering a light field with respect to a viewpoint for the POV point $C_{r9}$, latency in response to movements of the local subject 2 are substantially reduced.

Figure 7G:
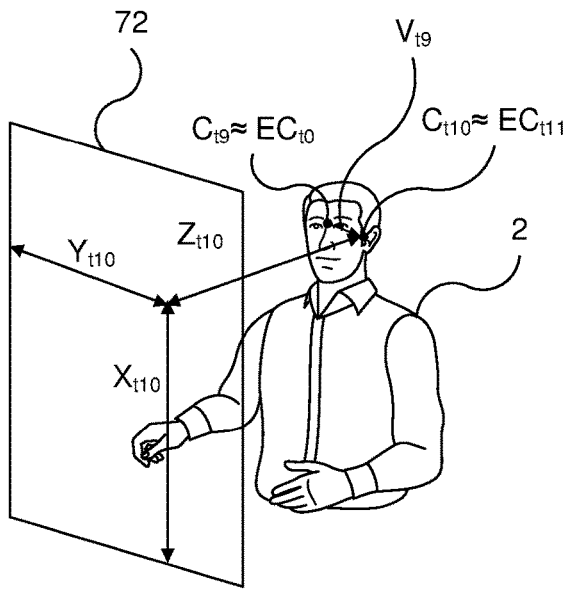

FIG. 7G illustrates another approach to rendering an image at the local telepresence device 100A based on the actual POV point $C_{r9}$ determined for the time t9. It may take a significant amount of time (for example, multiple frame display periods) to render an image corresponding to the POV point $C_{r9}$, resulting in the image of the remote subject 4 rendered for the POV point $C_{r9}$ being displayed at a later time, for example, at a time t10. Between the time t9 and the time 10, the local subject 2 may move to a POV point $C_{r10}$ that is different from the previous POV point $C_{r9}$. If so, an image rendered for the previous POV point $C_{r9}$ may no longer accurately correspond to the POV point $C_{r10}$, resulting in a latency perceptible to the local subject 2. When this occurs, the local subject 2 may feel that the displayed image of the remote subject 4 is less responsive and interactive.

To further reduce latency, motion prediction data (illustrated as a vector $V_{r10}$ in FIG. 7G) may be used at the time t9 to determine an estimated future POV point $C_{r10}$ for the time t10. The image for display to the local subject 2 is then rendered for a light field with respect to a viewpoint for the estimated future POV point $C_{r10}$, rather than the POV point $C_{r9}$. Where the estimated future POV point $C_{r10}$ is reasonably accurate, which is more likely on short time scales, the image of the remote subject 4 displayed on the local telepresence device 100A becomes more responsive to the movement of the local subject 2.

Referring to FIG. 5, the local subject POV data (e.g., previous, current and estimated future POVs point of the local subject 2) may be sent to the communications subsystem 440. The communications subsystem 440 may receive remote subject POV data from the remote telepresence device 100B. The remote subject POV data 442 may be generated in the same or similar manner as the local subject POV data 422.

The local tile selector 430 may receive the local captured image 402 (from the camera array 300), the depth information 412 (from the depth estimator 410) and the remote POV data 442 from (the communications subsystem 440). Based on the remote subject POV data 442 and/or the depth information 412, the local tile selector 430 may select tiles from different frame images (for example, previous or current frame images 60, 62 shown in FIG. 6). A tile refers to a segmented portion of a frame image. A frame image may include a plurality of tiles arranged in predetermined numbers of rows and columns. Each tile may be identifiable by its location in the frame image. Each tile may have a predetermined size, for example, 16 pixels arranged in a 4×4 array, 64 pixels arranged in an 8×8 array, or the like. Alternatively, the size and shape of the tiles may vary depending on, for example, subject movement frequency, level of details involved, etc. For example, smaller tiles may be used to select frequently changing, detailed or dense portions (e.g., hair, eye, hands, etc.). Larger tiles may be used to select stationary or monotonous portions (e.g., wall, background, etc.).

Based on at least one of the previous, current and estimated future remote subject POVs of the remote subject POV data 442, the local tile selector 430 may select those tiles that are likely to be used by the remote telepresence device 100B to composite an image of the local subject 2. For example, FIG. 6 shows a plurality of tiles 66A, 66B, 66C selected from the frame image 60B based on the on the remote subject POV data 442. Those tiles that are not likely to be used may be discarded. For example, when the remote subject POV data 442 indicates that the remote subject 4 is looking up, the remote telepresence device 100B may not need the tiles showing the top of the head, shoulder and hands. Hence, those tiles (for example, tiles 64A, 64B, 64C in the frame image 60A shown in FIG. 6) that correspond to these unnecessary portions may be discarded. Those selected tiles may be output as local image data 432 to the communication subsystem 440, which may then compress and package the local image data 432 with other local data, including the local subject POV data 422, and transmitted to the remote telepresence device 100B via the network 5.

In some implementations, the local tile selector 430 may also add the depth information 412 to the selected tiles. For example, the local selector 430 may obtain, from the depth estimator 410, the depth information 412 of each pixel of the selected tiles and add the depth information 412 to pixel color information (e.g., RGB). The added depth information may make it less time and resource-consuming to process the selected tiles when the local image data 432 is sent to the remote telepresence device 100B to composite images of the local subject 2.

In some implementations, the local telepresence device 100A may be constructed and operating to display an image of the remote subject 4. For example, the communications subsystem 440 may receive, unpackage and decompress data from the remote telepresence device 100B. The data from the remote telepresence device 100B may include remote image data 444. Similar to the local image data 432, the remote image data 444 may include a plurality of tiles selected from the frame images of the remote subject 4 at the remote telepresence device 100B. The tiles may be selected at the remote telepresence device 100B based on at least one of the previous, current and estimated future POVs of the local subject POV data 422 sent previously by the local telepresence device 100A. Hence, the remote image data 444 may include the tiles that may be needed to construct an image of the remote subject 4 at the local telepresence device 100A.

The communications subsystem 440 may send the remote image data 444 to the remote tile selector 450. The remote tile selector 450 may receive the local subject POV data 424, which may include the previous, current and estimated future POVs of the local subject 2. Based on the local subject POV data 424, the remote tile selector 450 may process the remote image data 444 to select tiles necessary to composite images of the remote subject 4. The remote tile selector 450 may then combine the selected tiles to composite one or more frame images of the remote subject 4, which may then be sent to a buffer 460. The buffer 460 may then output the frame images as a video signal 462 to the display 200. The display 200 may process the video signal 462 to display video images that may preserve the 3D geometric shape and eye gazing of the remote subject 4, which may be also responsive to the movements by the local subject 2. The remote telepresence device 100B may also display video images that may preserve the 3D geometric shape and eye gazing of the local subject 2, which may also be responsive to the movements by the remote subject 4.

The controller 400 may further include additional components necessary for teleconferencing, for example, a sound encoder 470, a sound decoder 480, etc. The sound encoder 470 may be connected to a microphone 110, which may be positioned on, for example, a hidden inner surface of the enclosure 500, to capture a voice from the local subject 2. The sound encoder 470 may encode and send the captured voice signal as local sound data 472 to the communications subsystem 440. The local sound data 472 may then be compressed and packaged by the communications subsystem 440 and sent to the remote telepresence device 100B via the network. In a similar manner, the data package from the remote telepresence device 100B may include remote sound data 446, which may be unpackaged and decompressed by the communications subsystem 440 and sent to the sound decoder 480. The sound decoder 480 may be connected to a speaker 120, which may be, similar to the microphone 110, positioned on a hidden inner surface of the enclosure 500. The sound decoder 480 may decode the remote sound data 446 and output an audio signal to the speaker 120 to reproduce the voice of the remote subject 4 at the local site 10.

In some implementations, the remote device 100B may be a non-telepresence device that may not provide the remote subject POV data. For example, the remote device 100B may be a virtual reality (VR) or augmented reality (AR) device. To work with the VR/AR machine, the local tile selector 430 (shown in FIG. 5) may select a plurality of tiles from the captured light field images and convert the selected tiles to local subject image data that can be used by the VR/AR device to render and display a 3D visual representation (e.g., 3D avatar) of the local subject 2. The local subject image data may include the local subject POV data, which may enable the 3D visual representation of the local subject 2 displayed on the VR/AR device to maintain eye gazing with the remote VR/AR user.

Figure 8:
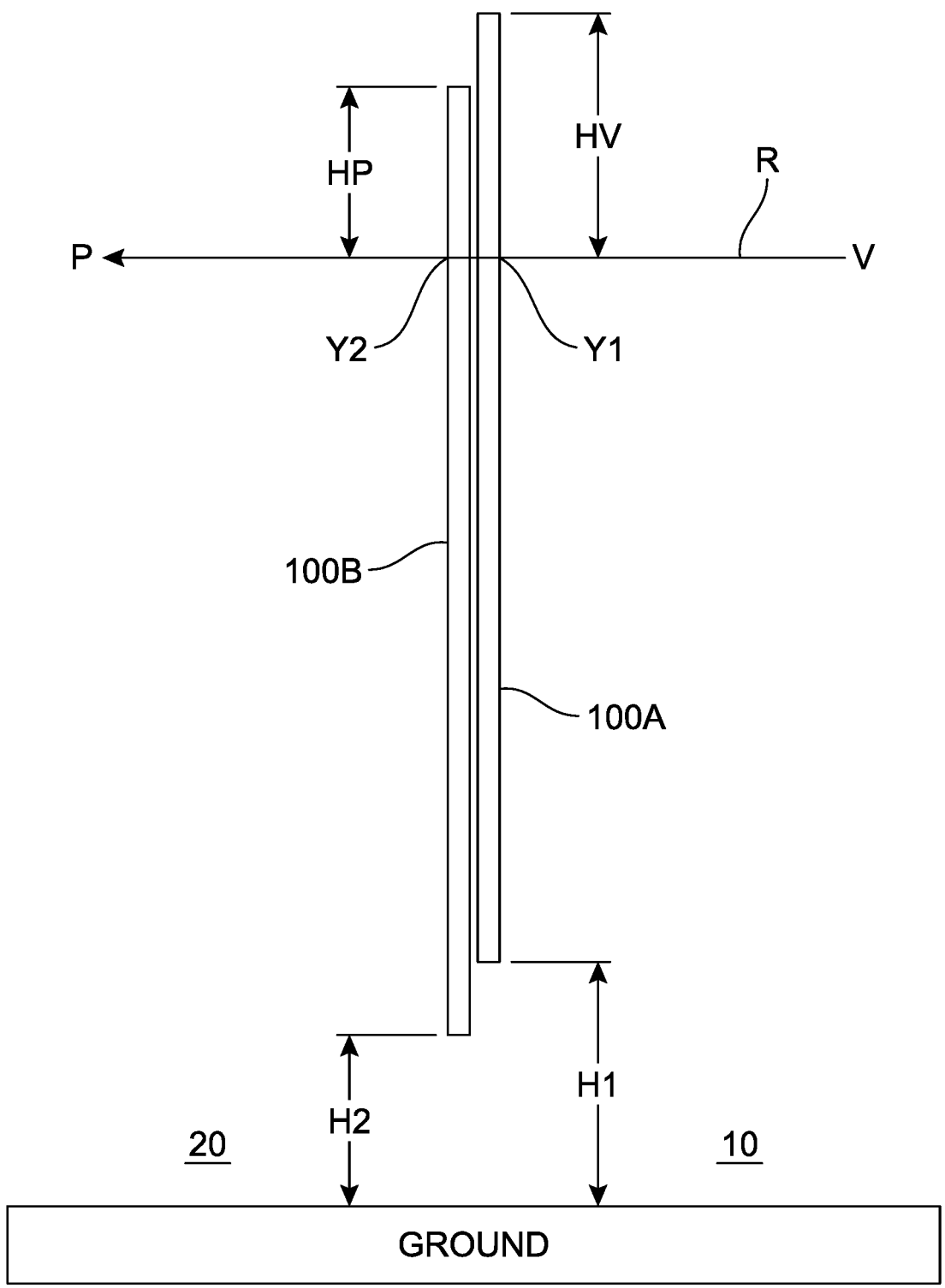
FIG. 8 illustrates an example of calibrating two remotely located telepresence devices positioned at different heights.

FIG. 8 illustrates an example of calibrating the local and remote telepresence devices 100A, 100B positioned at different heights. In some installation situations, two identically sized telepresence devices 100A, 100B may be positioned substantially perpendicular to but at different heights H1, H2 from the ground, which may cause a substantial eye level difference between the local and remote subjects 2, 4. Assuming that the center of projection (COP) of the light field cameras 302 is very close (e.g., less than 2 mm) to the display 200, the distance between the display 200 and the COP may be neglected by a simple calibration. For example, the ray R from a point V at the local site 10 to a point P at the remote site 20 passes through a point Y1 of the local telepresence device 100A and a point Y2 of the remote telepresence device 100B. In FIG. 8, a length HV represents the distance between the top of the telepresence device 100A and the ray passing point Y1, and a length HP represents the distance between the top of the telepresence device 100B and the ray passing point Y2, where the difference between the lengths HV, HP is the same as the difference between the heights H1, H2. Hence, a simple linear shift may be carried out during the installation calibration to compensate the telepresence device height variations. The height of each telepresence device may be determined manually using a ruler or the like. Alternatively, a sonar device or other measuring devices may be used to obtain a more accurate height estimation.

Figure 9:
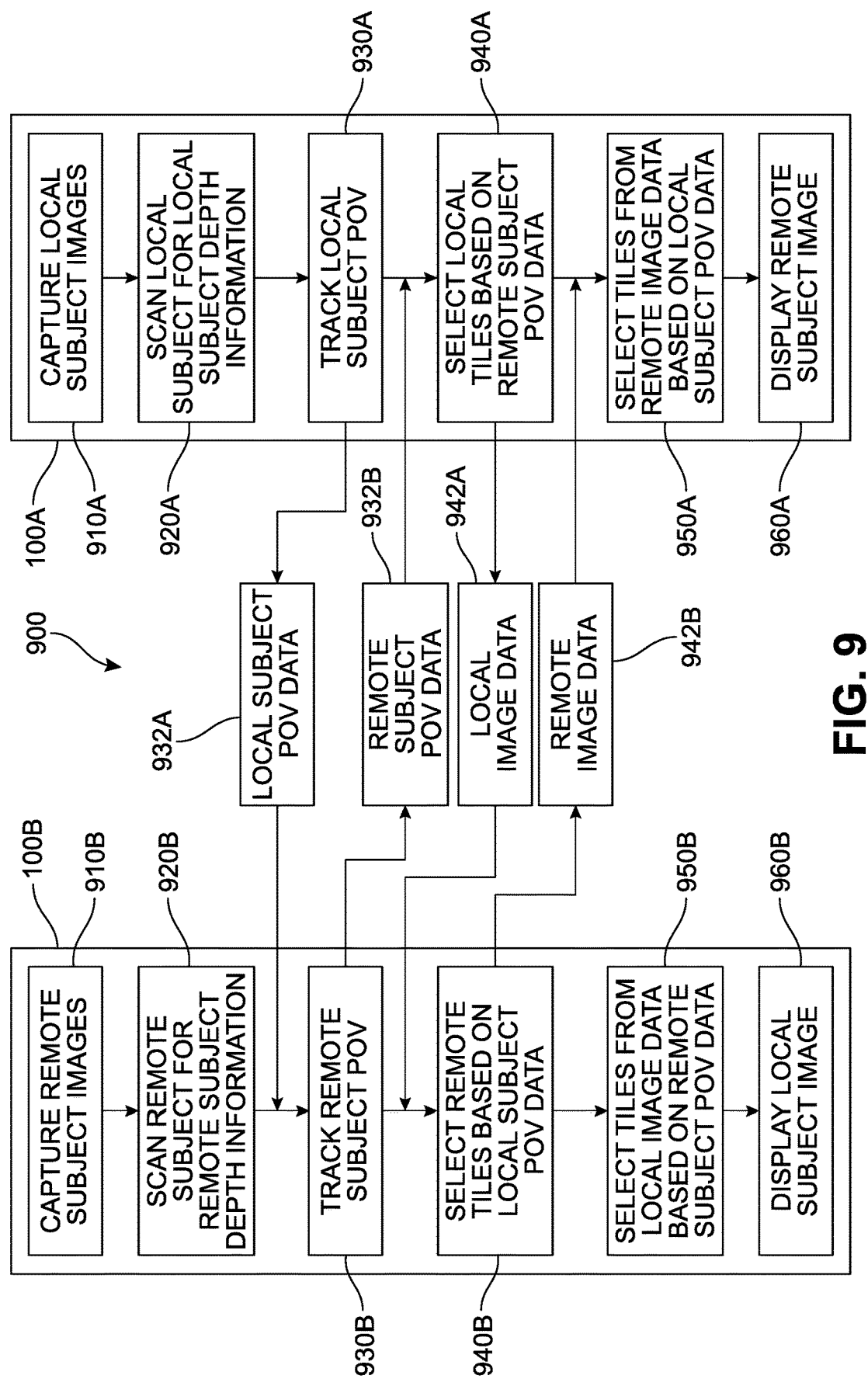
FIG. 9 illustrates a flow diagram showing example operations of and communications between the local and remote telepresence devices.

FIG. 9 illustrates a flow diagram showing example operations 900 of and communications between the local and remote telepresence devices 100A, 100B. Only a single operation cycle is shown in FIG. 9, but the same or similar cycle may be repeated at the local and remote telepresence devices 100A, 100B simultaneously until, for example, the videoconferencing session is over or the communications are interrupted.

The local telepresence device 100A may capture images (e.g., light field images) of the local subject 2 (Step 910A), using, for example, the camera array 300 (shown in FIG. 5), to generate local capture images 402 (shown in FIG. 5). Similarly, the remote telepresence device 100B may capture images (e.g., light field images) of the remote subject 4 (Step 910B) to generate remote capture images. The local and remote telepresence devices 100A, 100B may scan the local and remote subjects 2, 4, respectively, to obtain the depth information of the local and remote subjects 2, 4 (Steps 920A, 920B), using, for example, the depth camera 304 (shown in FIG. 5). As discussed above, the depth information may allow a less number of cameras 302 to be used. The scanning steps 920A, 920B may be optional and may not be carried out when the depth information is not needed or used in the operations 900.

At the local telepresence device 100A, the local captured images 402 may be processed by, for example, the POV tracker 420 (shown in FIG. 5) to track the POV of the local subject 2 (Step 930A) and generate local subject POV data 422 (shown in FIG. 5), which may include a current local subject POV and an estimated future local subject POV, as described above. The local subject POV data 422 may be sent to the remote telepresence device 100B (Step 932A). Similarly, at the remote telepresence device 100B, the remote captured images may be processed to track the POV of the remote subject 4 (Step 930B) and generate the remote subject POV data 442 (shown in FIG. 5). The remote subject POV data 442 may be sent to the local telepresence device 100A (Step 932B).

At the local telepresence device 100A, based on the remote subject POV data 442 received at Step 932B, the local capture images 402 may be processed by, for example, the local tile sector 430 (shown in FIG. 5), to select local tiles that may be needed to composite an image of the local subject 2 at the remote telepresence device 100B (Step 940A). Then, the local image data 432 (shown in FIG. 5) including the selected local tiles may be sent to the remote telepresence device 100B (Step 942A). As described above, the local image data 432 may include the depth information of the selected local tiles. Similarly, the remote captured images may be processed based on the local subject POV data 422 (shown in FIG. 5) to select remote tiles that may be needed to composite an image of the remote subject 4 at the local telepresence device 100A (Step 940B). Then, the remote telepresence device 100B may send the remote image data 444 (shown in FIG. 5), which includes the selected remote tiles (Step 942B). The remote image data 444 may also include the depth information of the selected remote tiles, as described above.

At the local telepresence device 100A, the remote image data 444 may be processed by, for example, the remote tile selector 450 (shown in FIG. 5), to select, from the remote tiles sent from the remote telepresence device 100B, those remote tiles that are needed to composite an image of the remote subject 4 (Step 950A) based on the local subject POV data 424 (shown in FIG. 5), for example, the current local subject POV. Using the selected remote tiles from Step 950A, the local telepresence device 100A may construct an image of the remote subject 4, which may then be displayed (Step 960A) at, for example, the display 200 (shown in FIG. 5)

Similar to Steps 950A, 960A, the remote telepresence device 100B may select, from the local tiles sent from the local telepresence device 100A, those local tiles that are needed to composite the image of the local subject 2 based on the remote subject POV data (Step 950B). The remote telepresence device 100B may then process the selected local tiles to composite and display the image of the local subject 2 (Step 960B).

The telepresence devices 100A, 100B constructed and operating as described above may provide improved immersion experiences, and the local and remote subjects 2, 4 may feel the same level of trust and empathy as being face-to-face to each other at the same location. Hence, the telepresence devices 100A, 100B may reduce or even eliminate time-consuming and costly travels for business or personal purposes.

Figure 10:
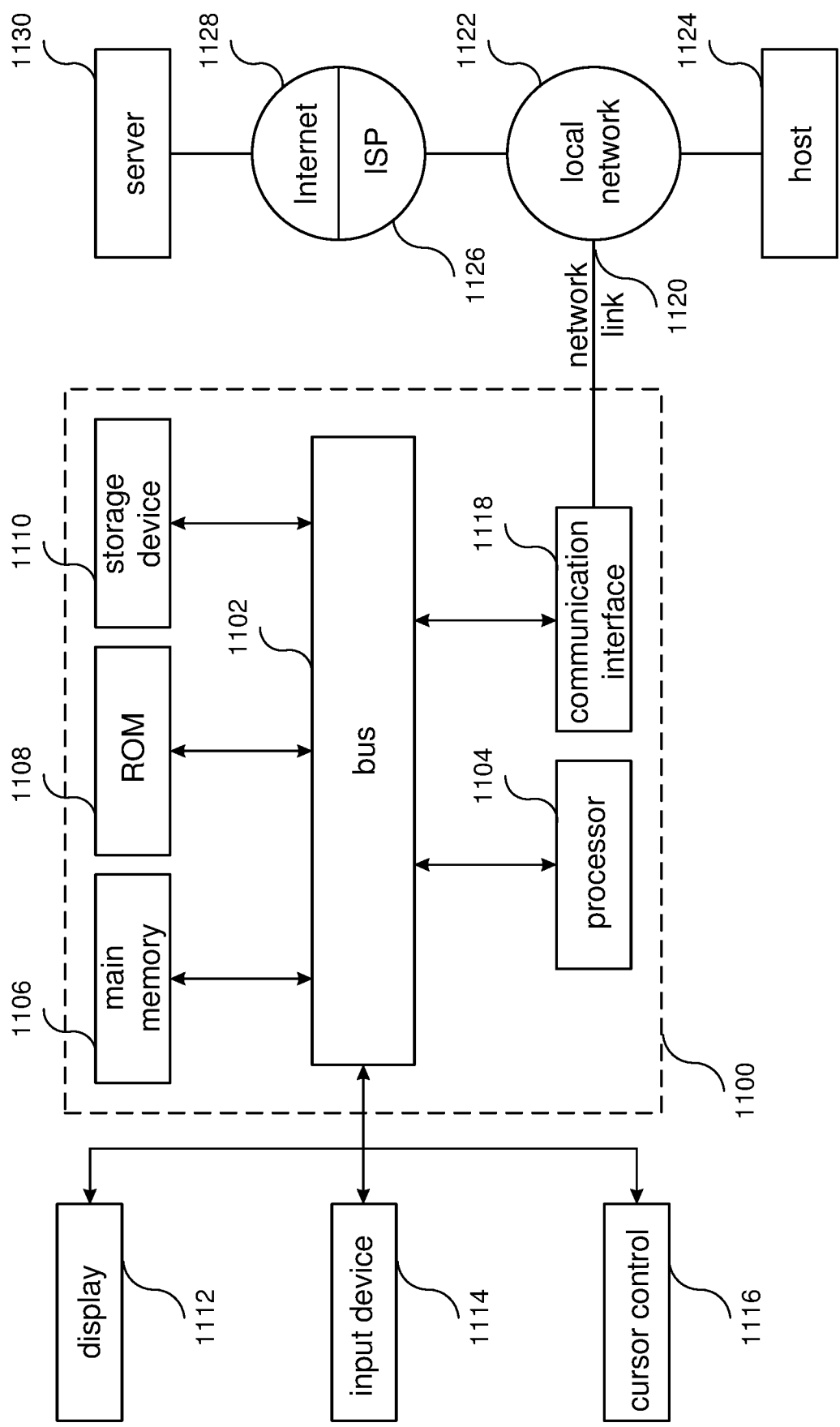
FIG. 10 illustrates a block diagram showing an example computer system upon which aspects of this disclosure may be implemented.

FIG. 10 illustrates a block diagram showing an example computer system 1100 upon which aspects of this disclosure may be implemented. Computer system 1100 includes a bus 1102 or other communication mechanism for communicating information, and a processor 1104 coupled with bus 1102 for processing information. Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. The computer system 1100 can implement, for example, one or more of, or portions of the telepresence devices 100A and 100B.

Computer system 1100 can further include a read only memory (ROM) 1108 or other static storage device coupled to bus 1102 for storing static information and instructions for processor 1104. A storage device 1110, such as a flash or other non-volatile memory can be coupled to bus 1102 for storing information and instructions.

Computer system 1100 may be coupled via bus 1102 to a display 1112, such as a liquid crystal display (LCD), for displaying information. One or more user input devices, such as the example user input device 1114 can be coupled to bus 1102, and can be configured for receiving various user inputs, such as user command selections and communicating these to processor 1104, or to a main memory 1106. The user input device 1114 can include physical structure, or virtual implementation, or both, providing user input modes or options, for controlling, for example, a cursor, visible to a user through display 1112 or through other techniques, and such modes or operations can include, for example virtual mouse, trackball, or cursor direction keys.

The computer system 1100 can include respective resources of processor 1104 executing, in an overlapping or interleaved manner, respective program instructions. Instructions may be read into main memory 1106 from another machine-readable medium, such as storage device 1110. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1110. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 1100 can also include a communication interface 1118 coupled to bus 1102, for two-way data communication coupling to a network link 1120 connected to a local network 1122. Network link 1120 can provide data communication through one or more networks to other data devices. For example, network link 1120 may provide a connection through local network 1122 to a host computer 1124 or to data equipment operated by an Internet Service Provider (ISP) 1126 to access through the Internet 1128 a server 1130, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for operating a device for generating an image of a remote subject, comprising:
   determining, at a first time, a first point of view (POV) of a local subject;
   sending, to a remote device, first POV data relating to the first POV of the local subject;
   receiving, from the remote device, first image data capturing a remote subject, the first image data comprising candidate image data selected at the remote device based on the first POV data of the local subject sent to the remote device;
   determining, at a second time, second POV data relating to a second POV of the local subject, the second time being later than the first time;
   based on the second POV data of the local subject, selecting second image data from the received first image data; and
   generating, based on the second image data selected based on the second POV, an image of the remote subject.

2. The method of claim 1, wherein determining, at the first time, the first POV of the local subject comprises:
   tracking a POV movement of the local subject;
   based on the tracked POV moment, estimating, at the first time, a first future POV of the local subject at a first future time; and
   generating the first POV data of the local subject based on the estimated first future POV of the local subject.

3. The method of claim 2, further comprising:
   based on the tracked POV movement, estimating, at the second time, a second future POV of the local subject at a second future time that is later than the first future time; and
   generating the second POV data based on the estimated second future POV of the local subject.

4. The method of claim 3, wherein tracking the POV movement of the local subject comprises:
   receiving a plurality of image frames capturing the local subject in sequence; and
   determining locations of POV points in the image frames received in sequence.

5. The method of claim 4, wherein estimating, at the first time, the first future POV of the local subject at the first future time comprises:
   calculating a motion vector of the POV points based on the determined locations of the POV points in the image frames received in sequence; and
   based on the calculated motion vector of the POV points, predicting, at the first time, the first future POV of the local subject at the first future time.

6. The method of claim 5, wherein:
   predicting, at the first time, the first future POV comprises predicting, at the first time, a plurality of possible future POVs of the local subject at the first future time,
   sending, to the remote device, the first POV data comprises sending, to the remote device, the first POV data relating to the plurality of possible first future POVs of the local subject, and
   the candidate image data is selected at the remote device based on the plurality of possible first future POVs.

7. The method of claim 4, wherein estimating, at the second time, the second future POV of the local subject at the second future time comprises:
   calculating a motion vector of the POV points based on the determined locations of the POV points in the image frames received in sequence; and
   based on the calculated motion vector of the POV points, predicting, at the second time, the second future POV of the local subject at the second future time.

8. The method of claim 1, wherein:
   the first image data comprises a plurality of first image tiles selected at the remote device based on the first POV of the local subject sent to the remote device, and
   the second image data comprises a plurality of second image tiles selected from the plurality of first image tiles based on the second POV of the local subject.

9. A device comprising:
   a processor; and
   a memory in communication with the processor, the memory comprising executable instructions that, when executed by the processor, cause the processor to control the device to perform functions of:
   determining, at a first time, a first point of view (POV) of a local subject;
   sending, to a remote device, first POV data relating to the first POV of the local subject;
   receiving, from the remote device, first image data capturing a remote subject, the first image data comprising candidate image data selected at the remote device based on the first POV data of the local subject sent to the remote device;
   determining, at a second time, second POV data relating to a second POV of the local subject, the second time being later than the first time;
   based on the second POV data of the local subject, selecting second image data from the received first image data; and
   generating, based on the second image data selected based on the second POV, an image of the remote subject.

10. The device of claim 9, wherein, for determining, at the first time, the first POV of the local subject, the instructions, when executed by the processor, further cause the processor to control the device to perform functions of:
    tracking a POV movement of the local subject;

based on the tracked POV moment, estimating, at the first time, a first future POV of the local subject at a first future time; and generating the first POV data of the local subject based on the estimated first future POV of the local subject.

11. The device of claim 10, wherein the instructions, when executed by the processor, further cause the processor to control the device to perform functions of:

based on the tracked POV movement, estimating, at the second time, a second future POV of the local subject at a second future time that is later than the first future time; and generating the second POV data based on the estimated second future POV of the local subject.

12. The device of claim 10, wherein, for tracking a POV movement of the local subject, the instructions, when executed by the processor, further cause the processor to control the device to perform functions of:

receiving a plurality of image frames capturing the local subject in sequence; and determining locations of POV points in the image frames received in sequence.

13. The device of claim 12, wherein, for estimating, at the first time, the first future POV of the local subject at the first future time, the instructions, when executed by the processor, further cause the processor to control the device to perform functions of:

calculating a motion vector of the POV points based on the determined locations of the POV points in the image frames received in sequence; and based on the calculated motion vector of the POV points, predicting, at the first time, the first future POV of the local subject at the first future time.

14. The device of claim 13, wherein:

for predicting, at the first time, the first future POV data, the instructions, when executed by the processor, further cause the processor to control the device to perform a function of predicting, at the first time, a plurality of possible future POVs of the local subject at the first future time, for sending, to the remote device, the first POV, the instructions, when executed by the processor, further cause the processor to control the device to perform a function of sending, to the remote device, the first POV data relating to the plurality of possible first future POVs of the local subject, and the candidate image data is selected at the remote device based on the plurality of possible first future POVs.

15. The device of claim 12, wherein, for estimating, at the second time, the second future POV of the local subject at the second future time, the instructions, when executed by the processor, further cause the processor to control the device to perform functions of:

calculating a motion vector of the POV points based on the determined locations of the POV points in the image frames received in sequence; and based on the calculated motion vector of the POV points, predicting, at the second time, the second future POV of the local subject at the second future time.

16. The device of claim 9, wherein:

the first image data comprises a plurality of first image tiles selected at the remote device based on the first POV of the local subject sent to the remote device, and the second image data comprises a plurality of second image tiles selected from the plurality of first image tiles based on the second POV of the local subject.

17. A method of operating a device for generating candidate image data of a local subject for further selection by a remote device, comprising:

generating local subject image data capturing the local subject;

receiving, from the remote device, first point of view (POV) data relating to a first POV of a remote subject determined by the remote device at a first time;

based on the first POV data received from the remote device, selecting, from the local subject image data, candidate image data for further selection at the remote device based on second POV date relating to a second POV of the remote subject determined by the remote device at a second time that is later than the first time; and sending, to the remote device, the candidate image data for further selection at the remote device based on the second POV data.

18. The method of claim 17, wherein the first POV of the remote subject comprises a first estimated future POV of the remote subject at a first future time.

19. The method of claim 18, wherein the first estimated future POV comprises a plurality of possible future POVs of the remote subject at the first future time.

20. The method of claim 18, wherein the second POV of the remote subject comprises a second estimated future POV of the remote subject at a second future time that is later than the first future time.

21. The method of claim 17, wherein the local subject image data comprises a plurality of image frames generated by a plurality of cameras capturing the local subject.

22. The method of claim 21, further comprising controlling the plurality of cameras to generate the plurality of image frames capturing the local subject.

23. The method of claim 21, wherein the plurality of cameras are tilted at different angles such that each image frame has a different perspective of the local subject.

24. The method of claim 21, wherein the candidate image data comprises a plurality of image tiles selected from the plurality of image frames based on the first POV data of the remote subject.

25. A device for generating candidate image data of a local subject for further selection by a remote device, comprising:

a processor; and a memory in communication with the processor, the memory comprising executable instructions that, when executed by the processor, cause the processor to control the device to perform functions of:

generating local subject image data capturing the local subject;

receiving, from the remote device, first point of view (POV) data relating to a fist POV of a remote subject determined by the remote device at a first time;

based on the first POV data received from the remote device, selecting, from the local subject image data, candidate image data for further selection at the remote device based on second POV data relating to a second POV of the remote subject determined by the remote device at a second time that is later than the first time; and sending, to the remote device, the candidate image data for further selection at the remote device based on the second POV data.

26. The device of claim 25, wherein the first POV of the remote subject comprises a first estimated future POV of the remote subject at a first future time.

27. The device of claim 26, wherein the first estimated future POV comprises a plurality of possible future POVs of the remote subject at the first future time.

28. The device of claim 26, wherein the second POV of the remote subject comprises a second estimated future POV of the remote subject at a second future time that is later than the first future time.

29. The device of claim 25, wherein the local subject image data comprises a plurality of image frames generated by a plurality of cameras capturing the local subject.

30. The device of claim 29, wherein the instructions, when executed by the processor, further cause the processor to control the device to perform a function of controlling the plurality of cameras to generate the plurality of image frames capturing the local subject.

31. The device of claim 29, wherein the plurality of cameras are tilted at different angles such that each image frame has a different perspective of the local subject.

32. The device of claim 29, wherein the candidate image data comprises a plurality of image tiles selected from the plurality of image frames based on the first POV data of the remote subject.

* * * * *